(12) United States Patent
Mito et al.

(10) Patent No.: US 11,921,688 B2
(45) Date of Patent: Mar. 5, 2024

(54) ENVIRONMENT CONSTRUCTION SUPPORT DEVICE AND ENVIRONMENT CONSTRUCTION SUPPORT METHOD

(71) Applicant: HITACHI, LTD., Tokyo (JP)

(72) Inventors: Misaki Mito, Tokyo (JP); Takatoshi Ohara, Tokyo (JP); Hideyuki Kanuka, Tokyo (JP); Minoru Tomisaka, Tokyo (JP); Kiyomi Hirohata, Tokyo (JP); Tooru Kawashima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 35 days.

(21) Appl. No.: 17/689,483

(22) Filed: Mar. 8, 2022

(65) Prior Publication Data

US 2023/0068819 A1 Mar. 2, 2023

(30) Foreign Application Priority Data

Aug. 27, 2021 (JP) .................................. 2021-139221

(51) Int. Cl.
*G06F 16/22* (2019.01)
(52) U.S. Cl.
CPC ................................ *G06F 16/2246* (2019.01)
(58) Field of Classification Search
CPC ............. G06F 16/9024; G06F 16/2246; G06F 16/288; G06F 16/9027; G06F 16/23; G06F 16/2329

(Continued)

(56) References Cited

U.S. PATENT DOCUMENTS

2005/0278353 A1* 12/2005 Norgaard ............... G06F 16/832
707/999.1
2007/0282470 A1* 12/2007 Hernandez ............ G06F 11/079
700/90

(Continued)

FOREIGN PATENT DOCUMENTS

JP 2020-017053 A 1/2020

OTHER PUBLICATIONS

Klaus Pohl, Gunter Bockle, and Frank J. Van Der Linden Software Product, Line Engineering: Foundations, Principles and Techniques Springer, 2005, pp. 427-428.

*Primary Examiner* — Phong H Nguyen
(74) *Attorney, Agent, or Firm* — Volpe Koenig

(57) ABSTRACT

According to the invention, it is possible to efficiently construct an environment for implementing an IT system. Provided is an environment construction support device. The environment construction support device stores a tree structure model that is information representing an environment for implementing an IT system in a tree structure and can be updated as needed, a construction script structure that is information related to a construction script that is a series of codes for constructing the environment and can be updated as needed, and parameter correspondence information that is information indicating a correspondence between an element of the tree structure model and an element of the construction script, and updates the parameter correspondence information to correspond to latest contents of the tree structure model and the construction script structure by comparing at least one of the tree structure model and the construction script structure with the parameter correspondence information.

12 Claims, 24 Drawing Sheets

(58) Field of Classification Search
USPC ........ 707/741, 797, 798, 802, 803, 829, 956
See application file for complete search history.

(56) References Cited

U.S. PATENT DOCUMENTS

| | | | |
|---|---|---|---|
| 2010/0114630 A1* | 5/2010 | Adler | G06Q 10/063 345/440 |
| 2020/0133689 A1* | 4/2020 | Ferrell | G06F 9/45558 |
| 2021/0011913 A1* | 1/2021 | Chandramouli | G06F 16/9024 |

* cited by examiner

FIG. 4A

FEATURE MODEL 111

| FEATURE ID | FEATURE NAME | VALUE | ROUTE (OPTION) | DEPENDENCY (ID, RELATION) | DEFAULT SELECTION STATE | PARENT FEATURE ID | RELATION WITH PARENT | ... |
|---|---|---|---|---|---|---|---|---|
| websys | Web System | Web3Tier | mandatory | | True | | | ... |
| app1 | App server | App | mandatory | | True | websys | | ... |
| app8 | Instance type | | mandatory | | True | app1 | | ... |
| app10 | small | Small Instance | selective | | True | app8 | IMPLEMENTATION VALUE | ... |
| app11 | large | Large Instance | selective | app12, AND | False | app8 | IMPLEMENTATION VALUE | ... |
| : | : | : | : | : | : | : | : | : |
| db10 | large | Large Instance | selective | | True | db8 | IMPLEMENTATION VALUE | ... |
| : | : | : | : | : | : | : | : | : |

SELECTED FEATURE MODEL 114

| FEATURE ID | FEATURE NAME | VALUE | DEPENDENCY (ID, RELATION) | CHILD FEATURE ID | RELATION WITH PARENT | ... |
|---|---|---|---|---|---|---|
| websys | WebSystem | Web3Tier | | network1, web1, app1, db1 | | |
| app1 | App server | App | | app2, app8, app14, app16, app18 | | ... |
| app8 | Instance type | | | app10, 1pp11 | | ... |
| app10 | small | Small Instance | | | IMPLEMENTATION VALUE | ... |
| : | : | : | : | : | : | : |
| db10 | large | Large Instance | | | IMPLEMENTATION VALUE | ... |
| : | : | : | : | : | : | : |

FIG. 4D

PARAMETER CORRESPONDENCE INFORMATION 113

| CURRENT Ver. | OLD Ver. | FEATURE ID | PARENT FEATURE ID | CHILD FEATURE ID | DEPENDENCY (ID, RELATION) | Parameter SetId | Parameter Tag | PARENT Parameter Tag | CHILD Parameter Tag | ... |
|---|---|---|---|---|---|---|---|---|---|---|
| 1.0 | | app10 | app8 | | | AppComp | {xxx_instance_type} | App | | ... |
| 1.0 | | app11 | app8 | | | AppComp | {xxx_instance_type} | App | | ... |
| 1.0 | | db10 | db8 | | | DBComp | {xxx_instance_type} | DB | | ... |
| : | : | : | : | : | : | : | : | | | : |
| 2.0 | 1.0 | app10 | app8 | | | AppComp | {xxx_instance_type} | App | | ... |
| 2.0 | 1.0 | app11 | app8 | | | AppComp | {xxx_instance_type} | App | | ... |
| 2.0 | 1.0 | db10 | db8 | | | DBComp | {xxx_instance_type} | DB | | ... |
| : | : | : | : | : | : | : | : | | | : |

1130 1131 1132 1133 1134 1135 1136 1137 1138 1139

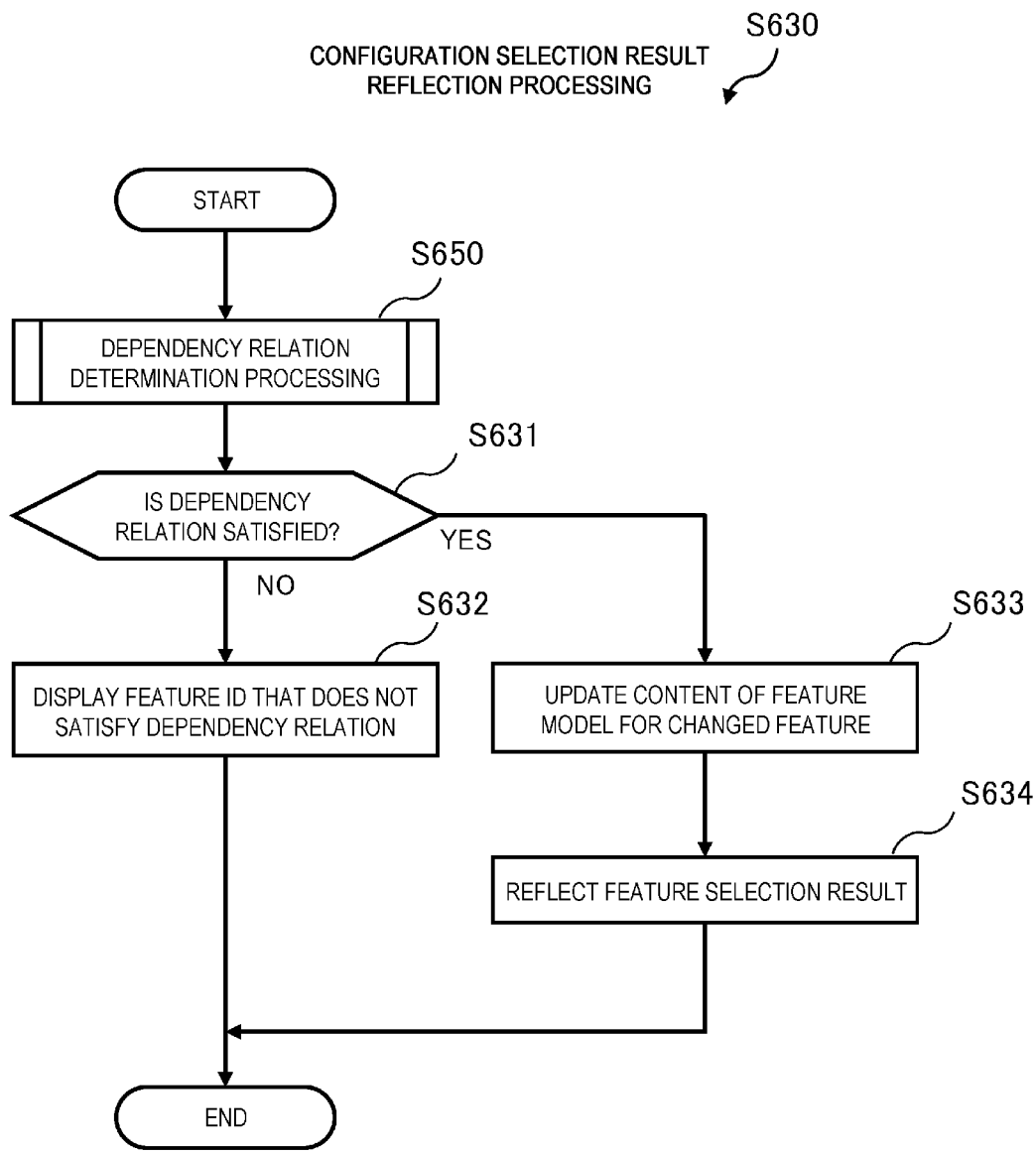

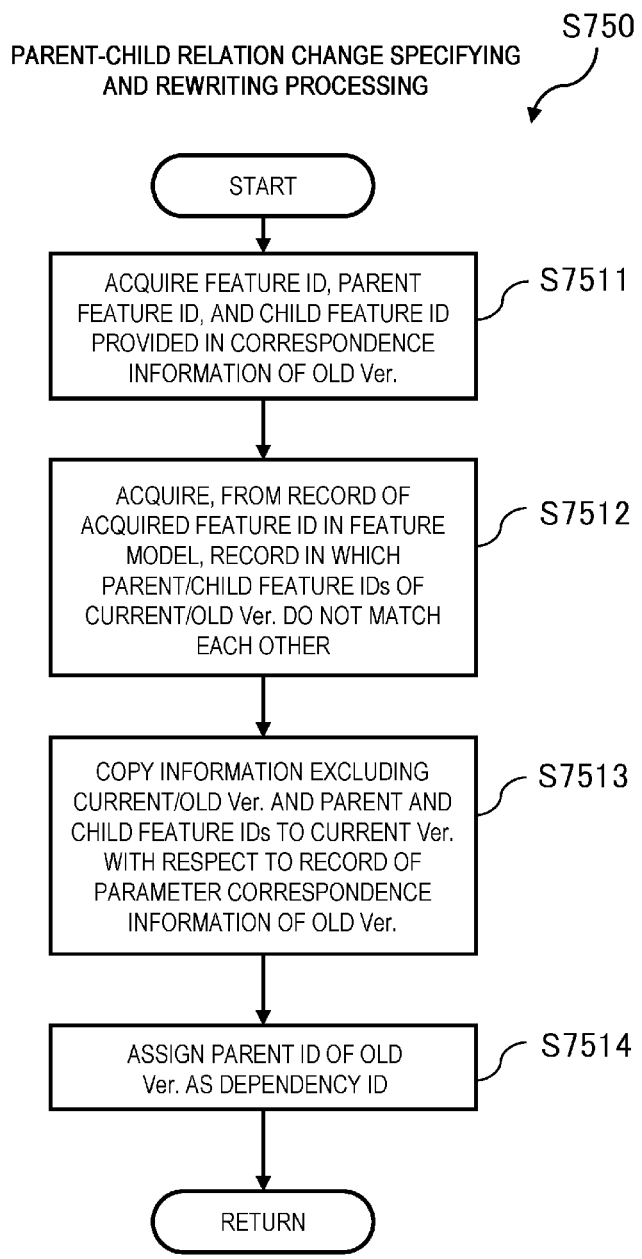

FIG. 8F

| UPDATE TYPE | A | B | C | D |
|---|---|---|---|---|
| CHANGE OF FEATURE MODEL (FM) | ELEMENT ADDED | ELEMENT ADDED | NONE | PARENT-CHILD RELATION BETWEEN ELEMENTS CHANGES |
| CHANGE OF CONSTRUCTION SCRIPT STRUCTURE (IaC) | IaC TAG ADDED | NONE | IaC TAG ADDED | NONE |
| IMAGE DIAGRAM (THICK LINE: CHANGE LOCATION) | | | | |

FIG. 11

EXAMPLE OF CONSTRUCTION SCRIPT

```
{
   "app1":{
      "Type" : "VM::Instance",
      "Propaties" : {
         "InstanceType" : "SmallInstance",
1171     "Storage" : {
            "Type" : "HDD",
            "Size" : "100"
         }
         :
         :
      },
      :
      :
   "db1":{
      "Type": "VM::Instance",
      "Propaties":{
         "InstanceType": "LargeInstance",
1172     "Storage" : {
            "Type" : "SSD",
            "Size" : "1000"
         }
         :
         :
      },
      :
      :
   }
}
```

ENVIRONMENT CONSTRUCTION SUPPORT DEVICE AND ENVIRONMENT CONSTRUCTION SUPPORT METHOD

CROSS-REFERENCE TO RELATED APPLICATION

This application claims priority pursuant to Japanese patent application No. 2021-139221, filed on Aug. 27, 2021, the entire disclosure of which is incorporated herein by reference.

BACKGROUND

1. Technical Field

The present invention relates to an environment construction support device and an environment construction support method.

2. Related Art

JP-A-2020-17053 (Patent Literature 1) describes an environment construction support system configured to execute environment construction of a financial system with high efficiency and reduced costs. The environment construction support system stores a constant design document related to an information processing device to be constructed, a definition file template defining setting contents for the information processing device, and a construction script template describing a series of environment construction commands to be executed for the information processing device, converts the constant design document into a constant setting value file by a predetermined tool, executes a predetermined environment construction tool by using the constant setting value file as an input, generates a definition file and a construction script by setting, in the definition file template and the construction script template, predetermined items in the constant design document, and distributes the definition file and the construction script to the information processing device. The information processing device executes the distributed construction script and constructs a predetermined environment defined by the constant design document.

Software Product Line Engineering: Foundations, Principles and Techniques (Klaus Pohl, Gunter Bockle, and Frank J. van der Linden, Springer, 2005) (Non-Patent Literature 1) describes that a construction script is decomposed in units of features which are constituent elements of a system, a feature model which is a model having the features represented in a tree structure is generated, and a user selects features in the feature model and executes corresponding construction scripts in combination to construct an environment of an IT system.

In general, construction of an environment (platform) for implementing an information technology (IT) system is entirely performed through manpower. For this reason, when an environment of an IT system is constructed, a user such as a developer is forced to perform complicated work and management due to rework caused by a design change, which may cause deterioration of the quality of the IT system and an increase in costs. Since an environment script is created for each IT system, construction scripts are often created individually for different IT systems, which may cause a waste.

When an IT system using a cloud environment is developed, a service is added to the cloud environment and edited as needed. However, since services have a dependency relation between each other, when adding or editing a service, it is necessary to specify a service related to the service to be added or edited, to edit a parameter for the specified service, and to edit a script for constructing an environment, which is a complicated task for the user. For example, in the example of Patent Literature 1, the constant design document corresponding to the construction script is defined, and when adding or editing a service, it is necessary to edit the construction script or the constant design document in consideration of a dependency relation. In Non-Patent Literature 1, a cloud environment can be constructed by selecting the feature model, but when adding a service to the cloud environment or editing a service, the feature model, the construction script, and a correspondence relation therebetween must be taken into consideration.

SUMMARY

The invention has been made in view of the background described above, and an object thereof is to provide an environment construction support device and an environment construction support method capable of efficiently constructing an environment for implementing an IT system.

According to an aspect of the invention, an environment construction support device includes: a storage unit configured with a processor and a storage device, and configured to store a tree structure model being information representing an environment for implementing an IT system in a tree structure, and capable of being updated as needed, a construction script structure being information related to a construction script that is a series of codes for constructing the environment, and capable of being updated as needed, and parameter correspondence information being information indicating a correspondence between an element of the tree structure model and an element of the construction script; and a parameter correspondence information update unit configured to update the parameter correspondence information so as to correspond to latest contents of the tree structure model and the construction script structure by comparing at least one of the tree structure model and the construction script structure with the parameter correspondence information.

Problems, configurations, and effects other than those described above will be clarified by the following description of embodiments.

According to the invention, it is possible to efficiently construct an environment for implementing an IT system.

BRIEF DESCRIPTION OF THE DRAWINGS

FIG. 4A is an example of a feature model.

FIG. 4C is an example of a selected feature model.

FIG. 4D is an example of parameter correspondence information.

FIG. 6C is a flowchart showing configuration selection result reflection processing.

FIG. 8D is a flowchart showing parent-child relation change specifying and rewriting processing.

FIG. 8F is a diagram showing a mode of changing (updating) a feature model or a construction script structure that can be supported by the environment construction support device.

FIG. 11 is an example of a construction script.

DESCRIPTION OF THE PREFERRED EMBODIMENTS

Figure 1:
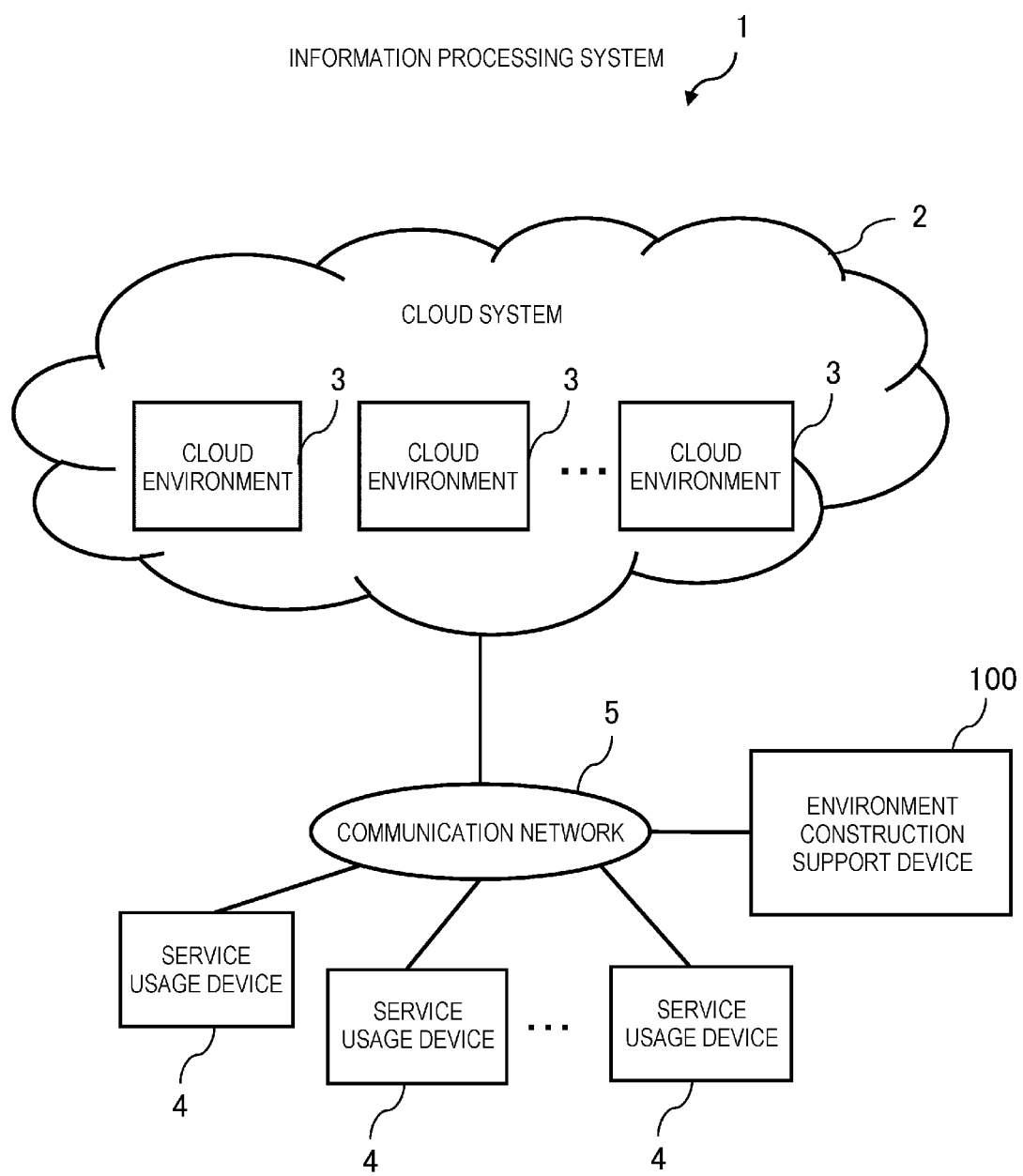
FIG. 1 is a diagram showing a schematic configuration of an information processing system according to an embodiment.

Hereinafter, an embodiment of the invention will be described with reference to the drawings. The following description and drawings are examples for describing the invention, and may be omitted and simplified as appropriate for clarifying the description. The invention can also be implemented in various other forms. Unless otherwise specified, each constituent element may be singular or plural.

In the following description, the same or similar configurations may be denoted by the same reference numerals, and duplicated description thereof may be omitted. In order to identify each of the same or similar configurations, the same reference numerals may be added with a suffix in parentheses or the like to distinguish the configurations from each other. In the following description, the letter "S" added in front of the reference numerals means a processing step. In the following description, the terms "first", "second", and the like are added to identify constituent elements, and do not necessarily limit the number or order of the constituent elements. In the following description, various kinds of information may be described by expressions such as "table" and "information", but the information may be expressed by a data structure other than these.

FIG. 1 is a diagram showing a schematic configuration of an information processing system 1 according to an embodiment. As shown in FIG. 1, an example of the information processing system 1 includes cloud environments 3 which are platforms for implementing an information technology (IT) system and are implemented by using resources (hardware resources and software resources) provided by a cloud system 2, service usage devices 4 that receive a service provided by the cloud environments 3, and an information processing device (hereinafter, referred to as an "environment construction support device 100") that supports construction of the cloud environments 3.

The cloud environment 3 and the service usage device 4 are communicably connected to each other via a communication network 5. The cloud environment 3 and the environment construction support device 100 are communicably connected to each other via the communication network 5. The communication network 5 is, for example, the Internet, a local area network (LAN), a wide area network (WAN), a dedicated line, or various public communication networks (a mobile phone network, a data communication network, and the like). The form of the communication network 5 is not necessarily limited to the examples. For example, a communication network that connects the cloud environment 3 and the service usage device 4 and a communication network that connects the cloud environment 3 and the environment construction support device 100 may be different communication networks.

The cloud environment 3 includes, for example, a virtual server (virtual information processing device) configured using virtual information processing resources provided using a virtualization technique, a process space separation technique, or the like. The cloud environment 3 provides services such as a software as a service (SaaS), a platform as a service (PaaS), and an infrastructure as a service (IaaS) to the service usage device 4. The cloud environment 3 provides a service to the service usage device 4 via, for example, an application programming interface (API).

The service usage device 4 accesses the cloud environment 3 via the communication network 5 and receives a service provided by the cloud environment 3.

The environment construction support device 100 supports work related to construction of the cloud environment 3 by a user who develops an information processing system using the cloud environment 3. The environment construction support device 100 manages a model (hereinafter, referred to as a "feature model") in which constituent elements (hereinafter, referred to as "features") of the cloud environment 3 to be constructed are represented by a tree structure, and information (hereinafter, referred to as a "construction script structure") related to a structure of a series of codes (hereinafter, referred to as a "construction script") executed when the cloud environment 3 is constructed. The construction script is, for example, a series of commands for managing and provisioning the cloud environment 3, which are generated based on an infrastructure as code (IaC). The environment construction support device 100 generates information (hereinafter, referred to as "parameter correspondence information") indicating a correspondence between the elements of the feature model and elements of the construction script structure.

The environment construction support device 100 receives a selection of the features constituting the feature model from the user via a user interface, and generates the construction script based on the received content (hereinafter, referred to as a "selected feature model"), the parameter correspondence information, and the construction script structure. The user can easily construct a desired environment by using the environment construction support device 100.

Figure 2:
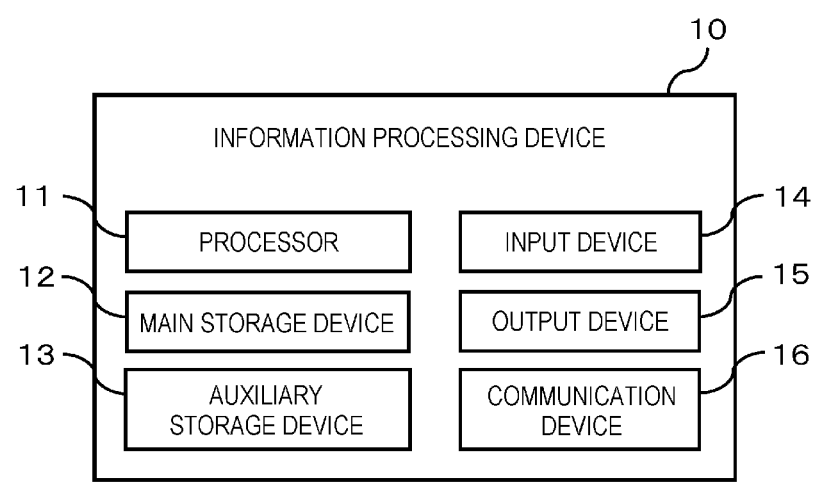
FIG. 2 is a block diagram showing an example of an information processing device constituting the information processing system.

FIG. 2 is a block diagram showing an example of an information processing device (computer) constituting the cloud environments 3, the service usage devices 4, and the environment construction support device 100. The information processing device constituting the cloud environments 3 is implemented by the resources of the cloud system 2. The service usage devices 4 and the environment construction support device 100 are implemented by, for example, an information processing device having the configuration shown in FIG. 2. The information processing device is, for example, a personal computer, a server device, a smartphone, a tablet, an office computer, or a general-purpose computer (main frame). All or a part of the configurations of the service usage device 4 and the environment construction support device 100 may be realized by, for example, the resources of the cloud system 2. All or a part of the configurations of the service usage device 4 and the environment construction support device 100 may be realized by, for example, a service provided by a cloud system via an application programming interface (API) or the like.

An example of an information processing device 10 includes a processor 11, a main storage device 12 (memory), an auxiliary storage device 13 (external storage device), an input device 14, an output device 15, and a communication device 16. These components are communicably connected to each other via a bus, a communication cable, or the like. The input device 14 and the output device 15 are not essential components. For example, the information processing device constituting the cloud environment 3 may not necessarily include the input device 14 or the output device 15.

The processor 11 includes, for example, a central processing unit (CPU), a micro processing unit (MPU), a graphics processing unit (GPU), a field programmable gate array (FPGA), an application specific integrated circuit (ASIC), and an artificial intelligence (AI) chip.

The main storage device 12 is a device that stores programs and data, and is, for example, a read only memory (ROM), a random access memory (RAM), or a non volatile RAM (NVRAM). Various functions provided by the cloud environments 3, the service usage devices 4, and the environment construction support device 100 are implemented by each processor 11 reading and executing programs stored in the main storage device 12.

The auxiliary storage device 13 is, for example, a read and write device of a non-transitory recording medium such as a solid state drive (SSD), a hard disc drive, an optical storage device (such as a compact disc (CD) and a digital versatile disc (DVD)), a storage system, an IC card, an SD card, or an optical recording medium, and a non-transitory storage domain of a cloud server. The auxiliary storage device 13 can read programs or data from another information processing device provided with a non-transitory recording medium or a non-transitory storage device via a read device of a recording medium or the communication device 16. Programs and data stored in the auxiliary storage device 13 are read into the main storage device 12 as needed.

The input device 14 is an interface that receives input of information from the outside, and is, for example, a keyboard, a mouse, a touch panel, a card reader, a tablet of a pen input type, a voice input device, or the like.

The output device 15 is an interface that outputs various kinds of information such as a processing progress and a processing result to the outside. The output device 15 is, for example, a display device (a liquid crystal monitor, a liquid crystal display (LCD), a graphic card, or the like) that visualizes the various kinds of information, a device (an audio output device (a speaker or the like)) that converts the various kinds of information into audio, or a device (a printing device or the like) that converts the various kinds of information into characters. For example, the information processing device 10 may be configured to input information to other devices or output information from other devices via the communication device 16.

The input device 14 and the output device 15 constitute a user interface that implements interactive processing (information reception, information provision, and the like) with a user.

The communication device 16 is a device that implements communication with other devices. The communication device 16 is a wired or wireless communication interface that implements communication with other devices via the communication network 5, and is, for example, a network interface card (NIC), a wireless communication module, a USB module, or the like.

For example, an operating system, a file system, a database management system (DBMS) (relational database, NoSQL, or the like), a key-value store (KVS), or the like may be introduced into the information processing device 10.

Information (data) managed in the cloud environments 3, the service usage devices 4, and the environment construction support device 100 is managed by, for example, a file system or a DBMS operating in each of the cloud environments 3, the service usage devices 4, and the environment construction support device 100.

Figure 3:
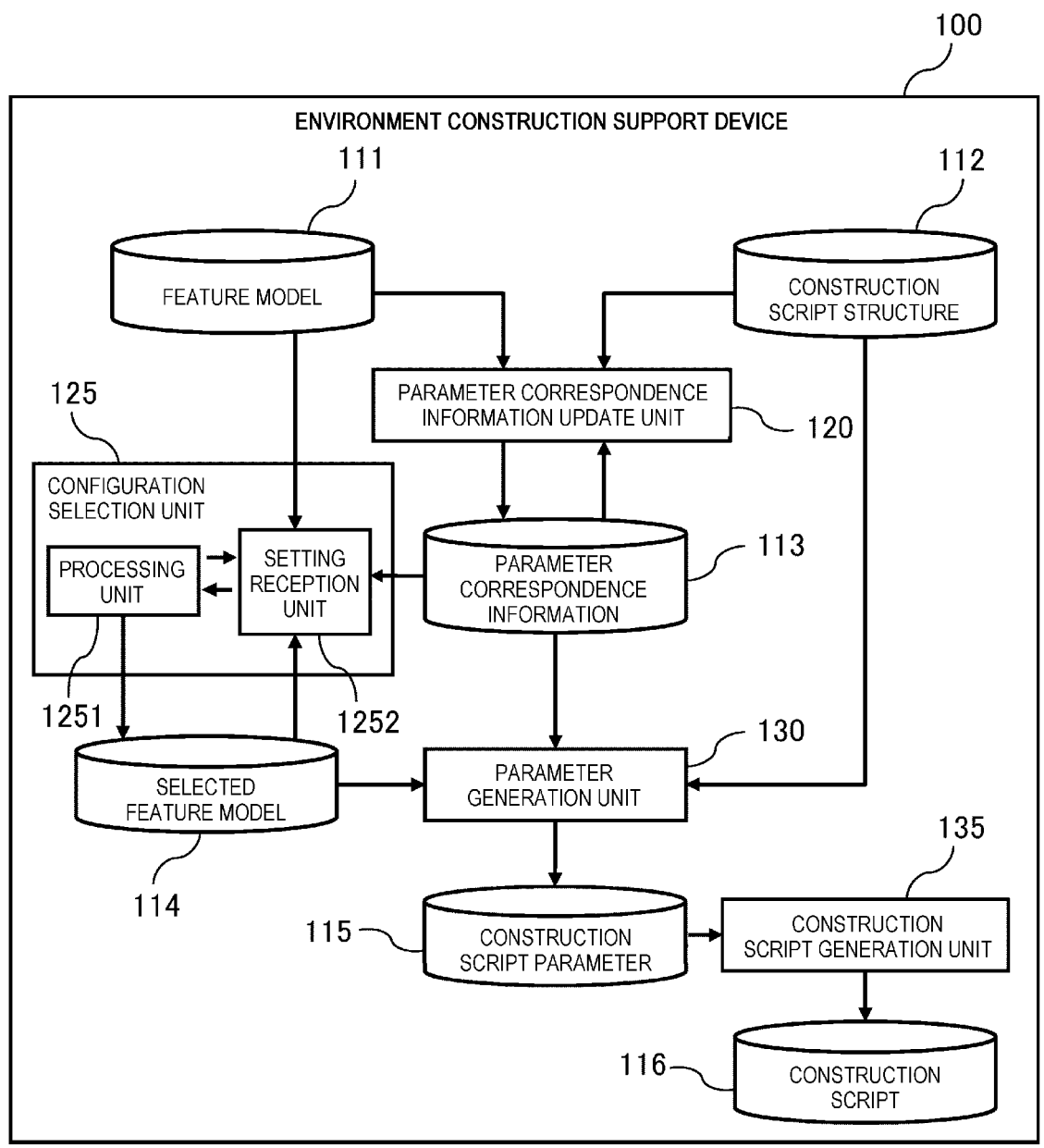
FIG. 3 is a system flow diagram showing main functions of an environment construction support device.

FIG. 3 is a system flow diagram showing main functions of the environment construction support device 100. As shown in FIG. 3, the environment construction support device 100 includes functions of a storage unit 110 (not shown), a parameter correspondence information update unit 120, a configuration selection unit 125, a parameter generation unit 130, and a construction script generation unit 135. As shown in FIG. 3, the configuration selection unit 125 includes a processing unit 1251 and a setting reception unit 1252.

Of the functions described above, the storage unit 110 stores information of a feature model 111, a construction script structure 112, parameter correspondence information 113, a selected feature model 114, a construction script parameter 115, and a construction script 116.

In the feature model 111 of the information, information related to a feature set (registered, edited, deleted, or the like) by a user via the user interface provided by the environment construction support device 100 or other information processing devices is managed.

In the construction script structure 112, information related to a construction script structure set (registered, edited, deleted, or the like) by a user via the user interface provided by the environment construction support device 100 or other information processing devices is managed.

In the parameter correspondence information 113, information related to parameter correspondence information generated by the parameter correspondence information update unit 120 is managed. In the selected feature model 114, information related to a feature model (selected feature model) selected by the configuration selection unit 125 performing interactive processing with a user is managed.

In the construction script parameter 115, information related to a parameter used to generate a construction script generated by the parameter generation unit 130 based on the construction script structure 112, the parameter correspondence information 113, and the selected feature model 114 is managed.

In the construction script 116, information related to the construction script 116 generated by the construction script generation unit 135 based on the construction script parameter 115 is managed. Details of these information will be described later.

Of the functions shown in FIG. 3, the parameter correspondence information update unit 120 updates a content of the parameter correspondence information 113 so as to correspond to latest contents of the feature model 111 and the construction script structure 112.

The configuration selection unit 125 receives a selection and setting of the feature model from a user, and generates the selected feature model 114 based on the received content. The setting reception unit 1252 of the configuration selection unit 125 receives setting of the feature model from the user while presenting a setting reception screen 500 to be described later, for example. The processing unit 1251 of the configuration selection unit 125 generates the selected feature model 114 based on the content received from the user by the setting reception unit 1252.

The parameter generation unit 130 generates the construction script parameter 115 based on the construction script structure 112, the parameter correspondence information 113, and the selected feature model 114.

The construction script generation unit 135 generates the construction script 116 based on the construction script parameter 115.

FIG. 4A is an example of the feature model 111. An example of the feature model 111 includes a plurality of records (entries) having items such as a feature ID 1111, a feature name 1112, a value 1113, a route 1114, a dependency 1115, a default selection state 1116, a parent feature ID 1117, and a relation with parent 1118. One record of the feature model 111 corresponds to one feature. The feature model 111 may further include items other than those shown in FIG. 4A, for example, items for storing information such as a feature cost.

The feature ID 1111 among the items described above stores a feature ID which is an identifier of a feature.

The feature name 1112 stores a name of the feature (hereinafter, referred to as a "feature name").

The value 1113 stores a value linked to a construction script for the feature.

The route 1114 stores information indicating whether the feature is an essential feature for a parent feature (essential selection "mandatory" or optional "selective"). For example, when values of the parent feature IDs 1117 of two or more features are the same and "selective" is stored in the route 1114, it is indicated that these features are "alternatively selectable" for the common parent feature.

The dependency 1115 stores the feature ID of a feature that has a dependency relation with the feature. The dependency 1115 also appropriately stores information indicating a type of the relation, such as "AND" indicating that a specific feature needs to be selected and "XOR" indicating that a specific feature needs to be unselected.

The default selection state 1116 stores information indicating whether the feature is selected as a default when the setting reception screen 500 described later is displayed.

The parent feature ID 1117 stores the feature ID of a parent feature of the feature in a feature model (tree structure model). As described above, in the feature model 111, the feature ID of the parent feature of each feature is stored in the parent feature ID 1117 to express a tree structure.

The relation with parent 1118 stores information indicating a relation of the feature with the parent feature, for example, information indicating an implementation value for the parent feature, such as a quantity or name of the parent feature (for example, "implementation value" or the like). For example, when a feature name of the parent feature is "Instance type" and a feature name of a child feature is "small" or "large", the child feature has a relation indicating specific implementation values such as "Instance type is small" and "Instance type is large" for the parent feature.

Figure 4B:
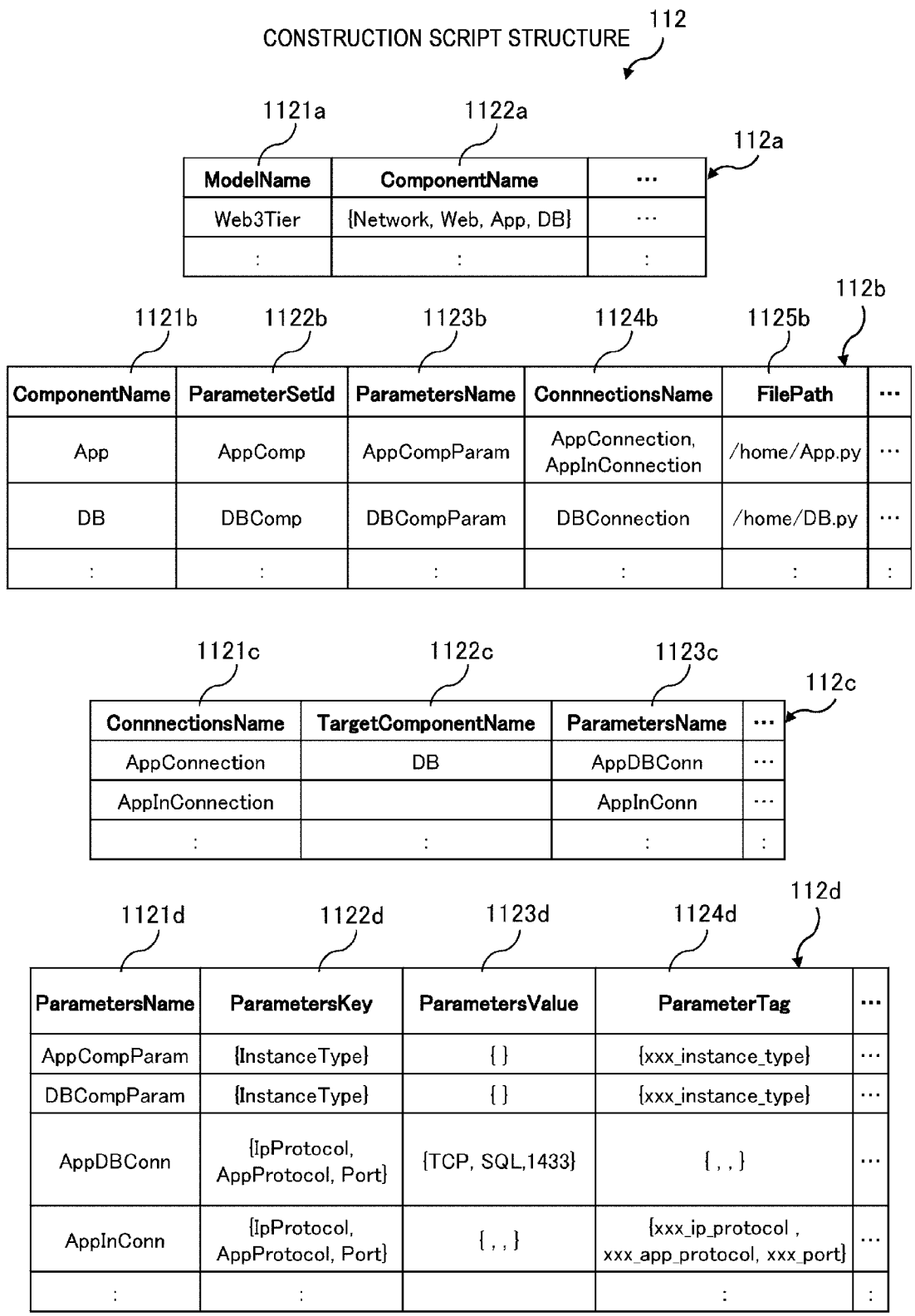
FIG. 4B is an example of a construction script structure.

FIG. 4B is an example of the construction script structure 112. The construction script structure 112 includes four tables, that is, a correspondence table 112a, a correspondence table 112b, a correspondence table 112c, and a correspondence table 112d.

In the correspondence table 112a, information indicating a correspondence relation between a feature model and components constituting the feature model is managed. The component is, for example, a unit in which a server to be constructed is classified for each predetermined function. As shown in FIG. 4B, an example of the correspondence table 112a includes one or more records (entries) having items of a ModelName 1121a and a ComponentName 1122a. One record in the correspondence table 112a corresponds to one feature model.

The ModelName 1121a among the items described above stores a name of the feature model (hereinafter, referred to as a "model name").

The ComponentName 1122a stores a name of the component (hereinafter, referred to as a "component name"). The ComponentName 1122a stores a value selected from a ComponentName 1121b in the correspondence table 112b.

In the present example, "Web3Tier" indicating a Web three-tier structure, which is a typical form of an IT system, is stored in the ModelName 1121a, and "Network", "Web", "App", and "DB", which are components constituting the Web three-tier structure, are stored in the ComponentName 1122a. In addition to "Web3Tier", for example, the ModelName 1121a appropriately stores information indicating a batch system or a unique architecture structure.

The correspondence table 112b manages information related to a parameter of a component. As shown in FIG. 4B, the correspondence table 112b includes one or more records (entries) having items of the ComponentName 1121b, a ParameterSetId 1122b, a ParametersName 1123b, a ConnectionsName 1124b, and a FilePath 1125b. One record in the correspondence table 112b corresponds to one component.

The ComponentName 1121b among the items described above stores the component name of the component.

The ParameterSetId 1122b stores an identifier of a parameter group for the component (hereinafter, referred to as "ParameterSetId").

The ParametersName 1123b stores a name of the parameter group related to the component. The ParametersName 1123b stores a value selected from a ParametersName 1121d in the correspondence table 112d.

The ConnectionsName 1124b stores an identifier (hereinafter, referred to as "ConnectionsName") of an information group related to information used when the component communicates with other components (hereinafter, referred to as "connection information"). The ConnectionsName 1124b stores a value selected from a ConnectionsName 1121c in the correspondence table 112c.

The FilePath 1125b stores information indicating a location (file path) of a file describing a script to be executed by receiving the parameter of the component. An entity of the script may be specified by other methods such as a method of specifying a file name describing the script.

The connection information described above is managed in the correspondence table 112c. As shown in FIG. 4B, the correspondence table 112c includes one or more records (entries) having items of the ConnectionsName 1121c, a TargetComponentName 1122c, and a ParametersName 1123c. One record in the correspondence table 112c corresponds to one of the connection information.

The ConnectionsName 1121C among the items described above stores the above-described ConnectionsName.

The TargetComponentName 1122c stores the component name of a component to be communicated in the connection information.

The ParametersName 1123c stores a name of a parameter group used for communication or the like in the connection information. The ParametersName 1123c stores a value selected from the ParametersName 1121d in the correspondence table 112d. In the present example, for "AppConnection" and "AppInConnection" stored in the ConnectionsName 1121c, "DB" and "blank (none)" are stored in the TargetComponentName 1122c, respectively. For "AppConnection" and "AppInConnection", "AppDBConn" and "AppInConn", which are the connection information with a component of a database and a name of a parameter related to communication used inside the component, are stored in the ParametersName 1123c, respectively.

In the correspondence table 112d, information related to a parameter is managed. As shown in FIG. 4B, the correspondence table 112d includes one or more records (entries) having items of the ParametersName 1121d, a ParametersKey 1122d, a ParametersValue 1123d, and a ParameterTag 1124d. One record in the correspondence table 112d corresponds to one parameter group.

The ParametersName 1121d among the items described above stores a name of the parameter group.

The ParametersKey 1122d stores a name (hereinafter, referred to as a "key name") of a value to be linked to a script file executed with reference to the parameter.

The ParametersValue 1123d stores a specific value corresponding to the key name. The ParametersValue 1123d can store a value in advance regardless of the feature model 111.

The ParameterTag 1124d stores tag information that defines a correspondence relation with the value 1113 of the feature model 111 using the parameter correspondence information 113.

In the present example, values stored in the ParametersKey 1122d, the ParametersValue 1123d, and the ParameterTag 1124d all show an example of one layer, and the values may be values in a plurality of layers.

FIG. 4C is an example of the selected feature model 114. The selected feature model 114 manages information of a feature (hereinafter, referred to as a "selected feature") selected from the feature model 111 by the configuration selection unit 125. An example of the selected feature model 114 includes a plurality of records (entries) having items such as a feature ID 1141, a feature name 1142, a value 1143, a dependency 1144, a child feature ID 1145, and a relation with parent 1146. One record of the selected feature model 114 corresponds to one selected feature. The selected feature model 114 may further include items other than those shown in FIG. 4C, for example, items for storing information such as a cost of a selected feature.

The feature ID 1141 among the items described above stores a feature ID of the selected feature.

The feature name 1142 stores a feature name of the selected feature.

The value 1143 stores a value linked to a construction script for the selected feature.

The dependency 1144 stores a feature ID of a feature that has a dependency relation with the selected feature.

The child feature ID 1145 stores a feature ID of a child feature of the selected feature.

The relation with parent 1146 stores information indicating a relation of the selected feature with a parent feature.

FIG. 4D is an example of the parameter correspondence information 113. An example of the parameter correspondence information 113 includes a plurality of records (entries) having items such as a current Ver. 1130, an old Ver. 1131, a feature ID 1132, a parent feature ID 1133, a child feature ID 1134, a dependency 1135, a ParameterSetId 1136, a ParameterTag 1137, a parent ParameterTag 1138, and a child ParameterTag 1139. One record of the parameter correspondence information 113 corresponds to one of the features constituting the feature model. The parameter correspondence information 113 may further include items other than those shown in FIG. 4D, for example, items for storing information such as a value to which a feature is linked.

Of the items described above, the current Ver. 1130 and the old Ver. 1131 store information indicating a current version and a previous version of a parameter of the feature. That is, when the contents of the feature model 111 and the construction script structure 112 are updated by the parameter correspondence information update unit 120, the current Ver. 1130 stores information indicating a version of a correspondence relation of the parameter of the feature after the update, and the old Ver. 1131 stores information indicating a version of a correspondence relation of the parameter of the feature before the update.

The feature ID 1132 stores a feature ID of the feature.

The parent feature ID 1133 stores a feature ID of a parent feature of the feature.

The child feature ID 1134 stores a feature ID of a child feature of the feature.

The dependency 1135 stores a feature ID of a feature that has a dependency relation with the feature. The dependency 1135 also appropriately stores information indicating a type of the relation, such as "AND" indicating that a specific feature needs to be selected and "XOR" indicating that a specific feature needs to be unselected.

The ParameterSetId 1136 stores a value of the ParameterSetId 1122b in the correspondence table 112b of the construction script structure 112, which is linked to the feature.

The ParameterTag 1137 stores a value of the ParameterTag 1124d in the correspondence table 112d of the construction script structure 112, which is linked to the feature.

The parent ParameterTag 1138 stores information indicating an upper element of the ParameterTag 1124d in the correspondence table 112d of the construction script structure 112, which is linked to the feature.

The child ParameterTag 1139 stores information indicating a lower element of the ParameterTag 1124d in the correspondence table 112d of the construction script structure 112, which is linked to the feature.

Figure 4E:
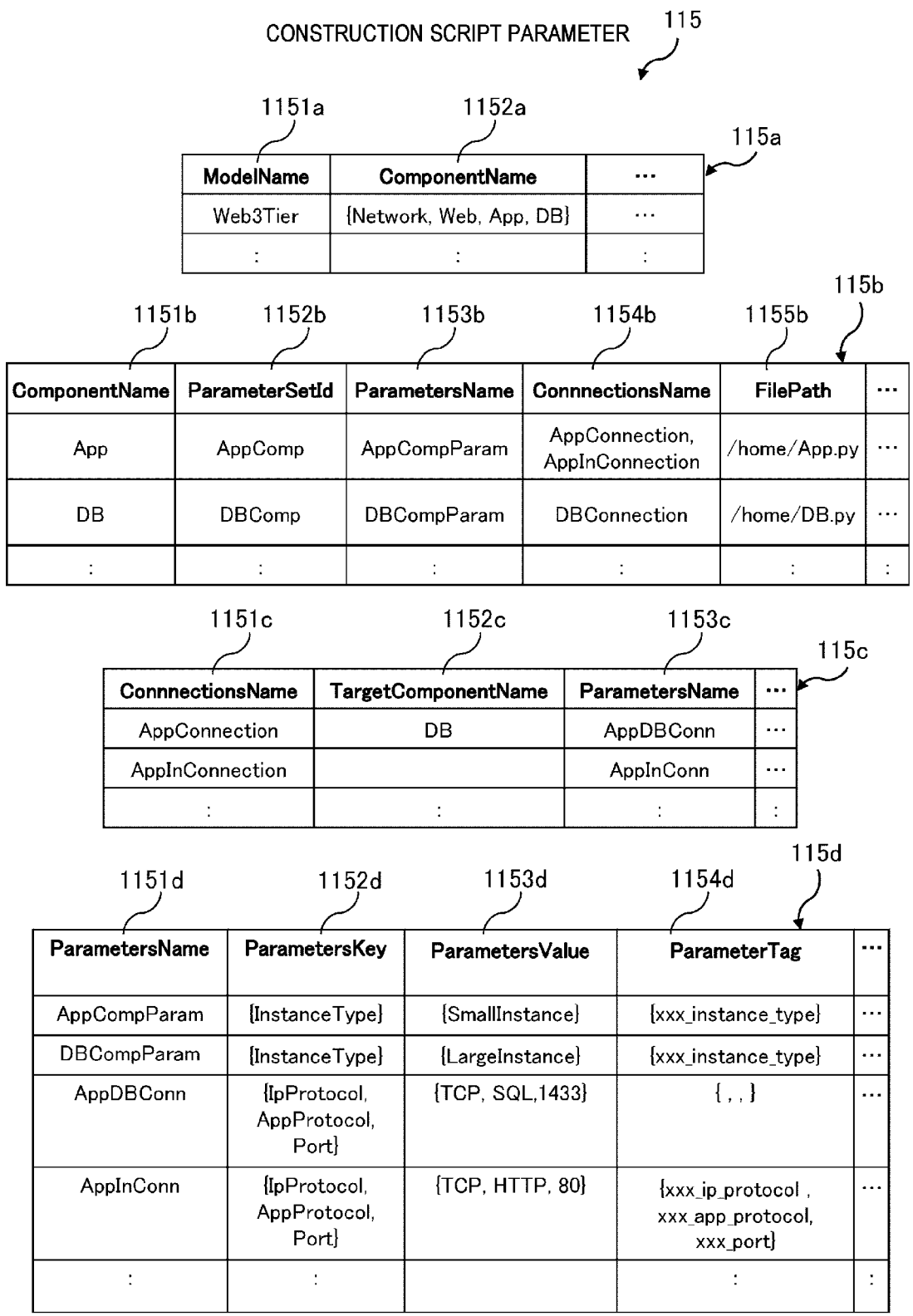
FIG. 4E is an example of a construction script parameter.

FIG. 4E is an example of the construction script parameter 115. The construction script parameter 115 includes a correspondence table 115a, a correspondence table 115b, a correspondence table 115c, and a correspondence table 115d. The meaning of each item of the tables is the same as the meaning of the corresponding tables (the correspondence table 112a, the correspondence table 112b, the correspondence table 112c, and the correspondence table 112d) of the construction script structure shown in FIG. 4B, and thus the description thereof will be omitted.

Setting Reception of Feature Model

Figure 5:
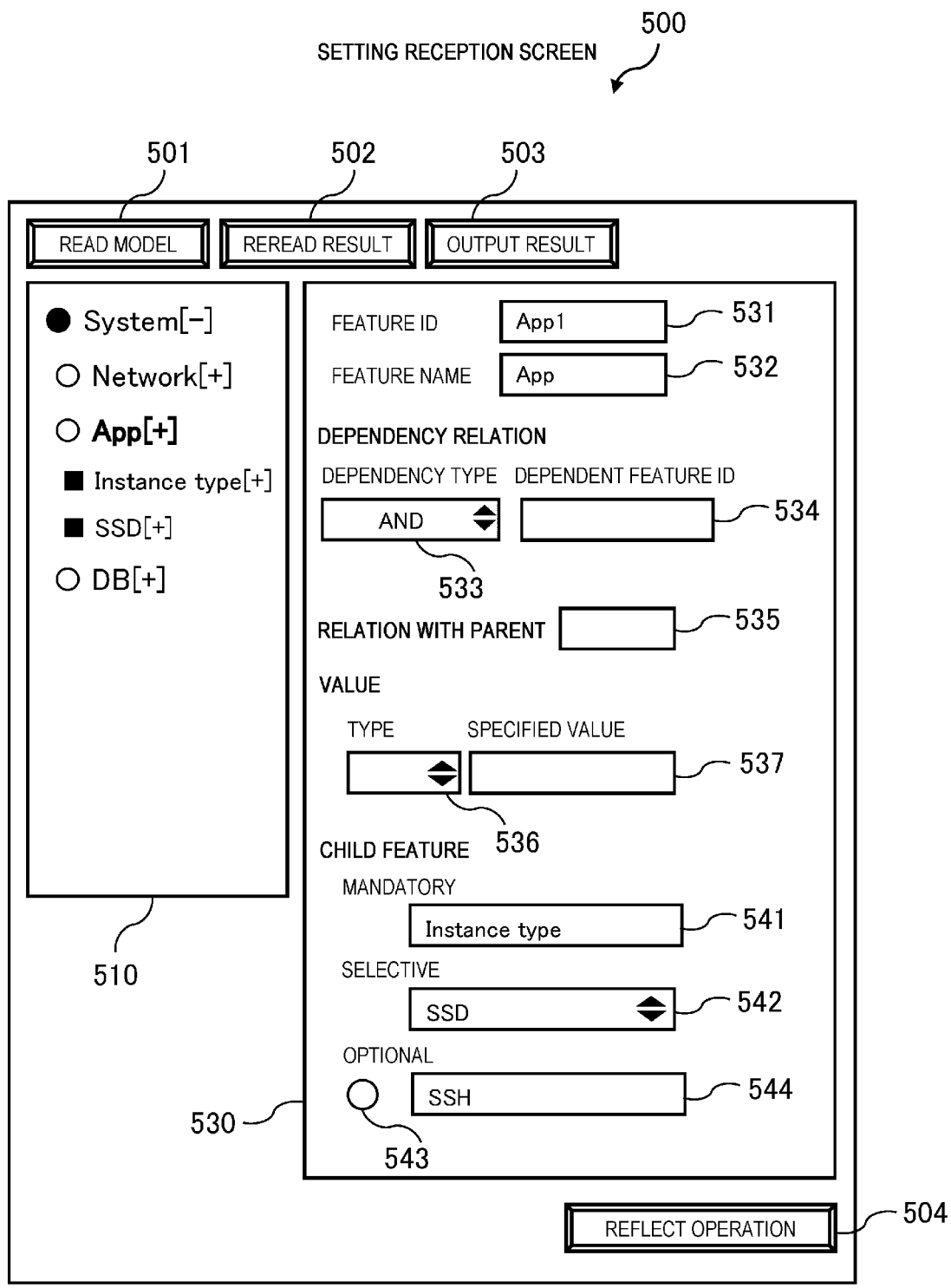
FIG. 5 is an example of a setting reception screen.

FIG. 5 is an example of a screen (hereinafter, referred to as a "setting reception screen 500") displayed when the setting reception unit 1252 of the configuration selection unit 125 shown in FIG. 3 receives setting of the feature model from the user. An example of the setting reception screen 500 includes a model read button 501, a result reread button 502, a result output button 503, a feature model display unit 510, a selected feature information display unit 530, and an operation reflection button 504.

When a user operates the model read button 501, the setting reception unit 1252 reads a content of the feature model 111 and displays an image representing the read content in a tree structure on the feature model display unit 510. The tree structure is represented by a feature name in the present example, and the tree structure may be represented by a feature ID which is a feature identifier.

When the user selects one of the features displayed on the feature model display unit 510, a content corresponding to the selected feature is displayed on the selected feature information display unit 530.

An example of the selected feature information display unit 530 includes: a feature ID input field 531, a feature name input field 532, a setting field 533 of a type of a dependency relation of a feature selected by a user in the feature model display unit 510 (hereinafter, referred to as a "dependency type"), an input field 534 of a feature ID which is an identifier of a feature on which the selected feature depends, an input field 535 of a relation with a parent feature of the feature, a setting unit 536 of a type of a value of the feature, a setting field 537 of the value of the feature, a setting field 541 of a name of a child feature of the feature, which has a mandatory root, a display field 542 of a name of a child feature to be selected when the child feature has a selective root, a check box 543 indicating whether a child feature having an optional root can be selected, and a setting field 544 of a name of the child feature having an optional root T.

When the user operates the operation reflection button 504, the setting reception unit 1252 reflects a content set in the selected feature information display unit 530 in the feature model display unit 510.

When the user operates the result reread button 502, the setting reception unit 1252 reads a content of the selected feature model 114 and displays the content on the feature model display unit 510.

When the user operates the result output button 503, the setting reception unit 1252 reflects, in the selected feature model 114, a content of the feature model set by the feature model display unit 510 and the selected feature information display unit 530.

Next, various kinds of processing performed by the environment construction support device 100 when setting of a feature model is received from the user will be described in order.

Figure 6A:
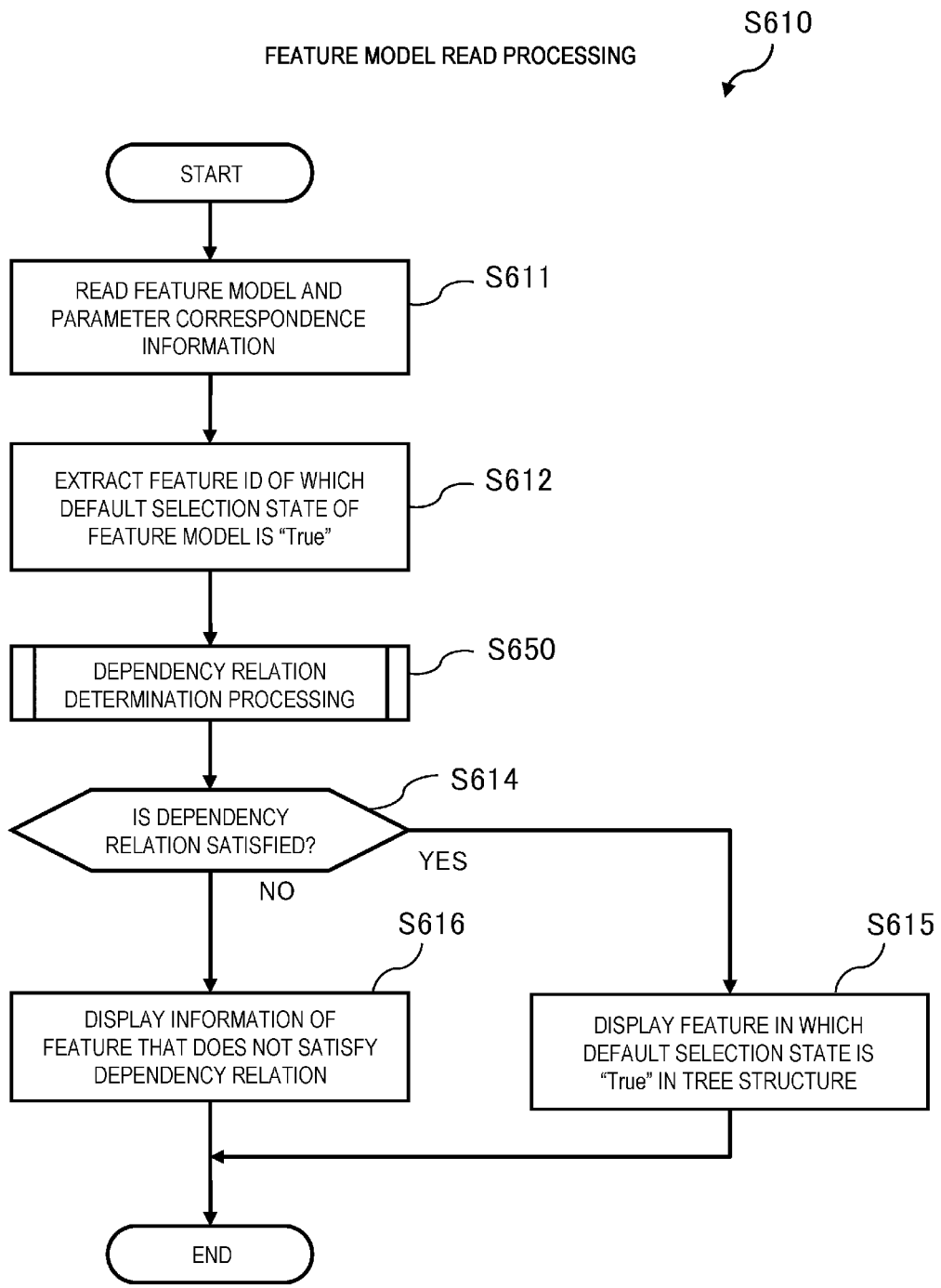
FIG. 6A is a flowchart showing feature model reading processing.

FIG. 6A is a flowchart showing processing (hereinafter, referred to as "feature model read processing S610") performed by the configuration selection unit 125 when the model read button 501 in FIG. 5 is operated. Hereinafter, the feature model read processing S610 will be described with reference to FIG. 6A.

As shown in FIG. 6A, first, the configuration selection unit 125 reads current contents of the feature model 111 and the parameter correspondence information 113 (S611).

Next, the configuration selection unit 125 extracts the feature ID 1111 of a feature in which the default selection state 1116 of the feature model 111 is "True" (S612).

Next, the configuration selection unit 125 executes dependency relation determination processing S650, and determines whether a return value (determination result) of the dependency relation determination processing S650 indicates that a dependency relation is satisfied (S614). When the dependency relation is not satisfied, it means that in the feature model 111 and the parameter correspondence information 113, there is a contradiction in the dependency relation of features (feature ID setting), for example. Details of the dependency relation determination processing S650 will be described later.

When the return value indicates that a dependency relation is satisfied (S614: YES), the configuration selection unit 125 displays, on the feature model display unit 510, a feature in which "True" is stored in the default selection state 1116 of the feature model 111 in a tree structure (S615), and then the processing ends. On the other hand, when the return value indicates that the dependency relation is not satisfied (S614: NO), the configuration selection unit 125 displays information related to a feature (feature ID or the like of the feature) determined not to satisfy the dependency relation (S616), and then the processing ends. In S616, for example, the configuration selection unit 125 may display a warning message or present a correction method for satisfying the dependency relation. As described above, since the configuration selection unit 125 checks whether a dependency relation is satisfied before a user performs an operation on the setting reception screen 500, the user does not perform unnecessary work. It is possible to smoothly generate an appropriate construction script without contradiction.

Figure 6B:
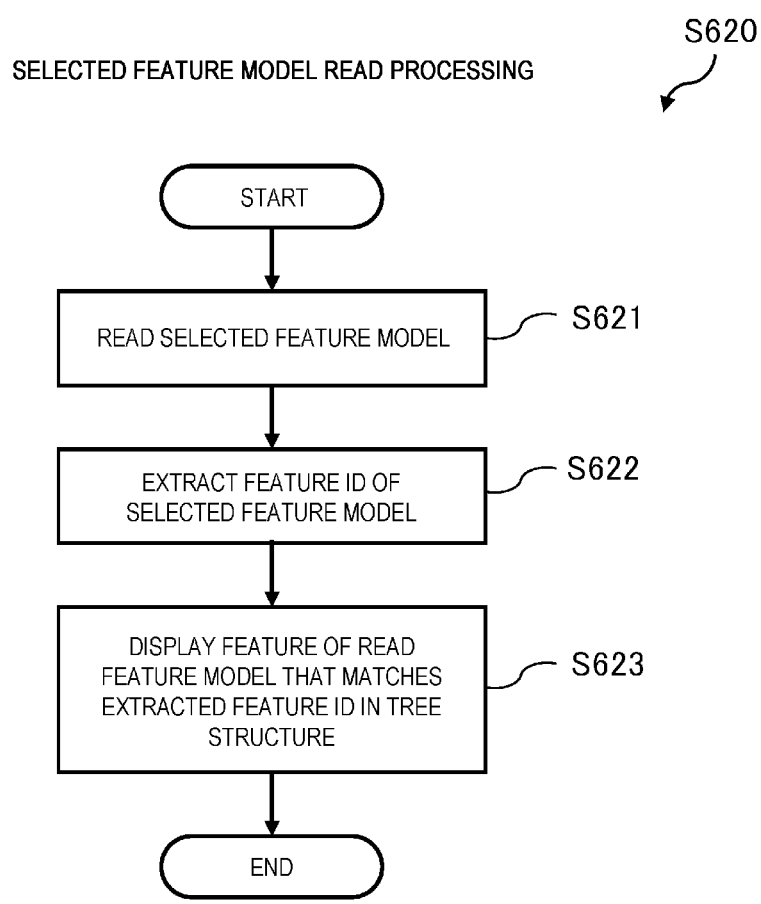
FIG. 6B is a flowchart showing selected feature model reading processing.

FIG. 6B is a flowchart showing processing (hereinafter, referred to as "selected feature model read processing S620") performed by the configuration selection unit 125 when the result reread button 502 in FIG. 5 is operated. Hereinafter, the selected feature model read processing S620 will be described with reference to FIG. 6B.

As shown in FIG. 6B, first, the configuration selection unit 125 reads the selected feature model 114 (S621), and extracts a feature ID stored in the feature ID 1141 of the selected feature model 114 (S622).

Next, the configuration selection unit 125 selects a feature ID of the feature ID 1111 of the read feature model 111 that matches the extracted feature ID, displays, on the feature model display unit 510 of the setting reception screen 500, a tree structure based on a feature of the selected feature ID (S623), and ends the processing.

FIG. 6C is a flowchart showing processing (hereinafter, referred to as "configuration selection result reflection processing S630") performed by the configuration selection unit 125 when the operation reflection button 504 in FIG. 5 is operated. Hereinafter, the configuration selection result reflection processing S630 will be described with reference to FIG. 6C.

As shown in FIG. 6C, first, the configuration selection unit 125 executes the dependency relation determination processing S650 described above on a changed feature model corresponding to setting received from a user via the selected feature information display unit 530.

Next, the configuration selection unit 125 determines a return value of the dependency relation determination processing S650 (S631). When the return value of the dependency relation determination processing S650 indicates that a dependency relation is not satisfied (S631: NO), the processing proceeds to S632. On the other hand, when the return value of the dependency relation determination processing S650 indicates that the dependency relation is satisfied (S631: YES), the processing proceeds to S633.

In S632, the configuration selection unit 125 displays a feature ID that does not satisfy the dependency relation, and ends the processing. In S632, the configuration selection unit 125 may display a warning message or present a correction method for satisfying the dependency relation. As described above, since the configuration selection unit 125 checks whether a dependency relation is satisfied for a changed feature model corresponding to setting received from a user, it is possible to generate an appropriate construction script without contradiction.

In S633, the configuration selection unit 125 updates a content of the feature model 111 for a feature displayed on the selected feature information display unit 530 to a changed content of the selected feature information display unit 530.

Next, the configuration selection unit 125 reflects the updated content in the feature model display unit 510 (S634). Thereafter, the processing ends.

Figure 6D:
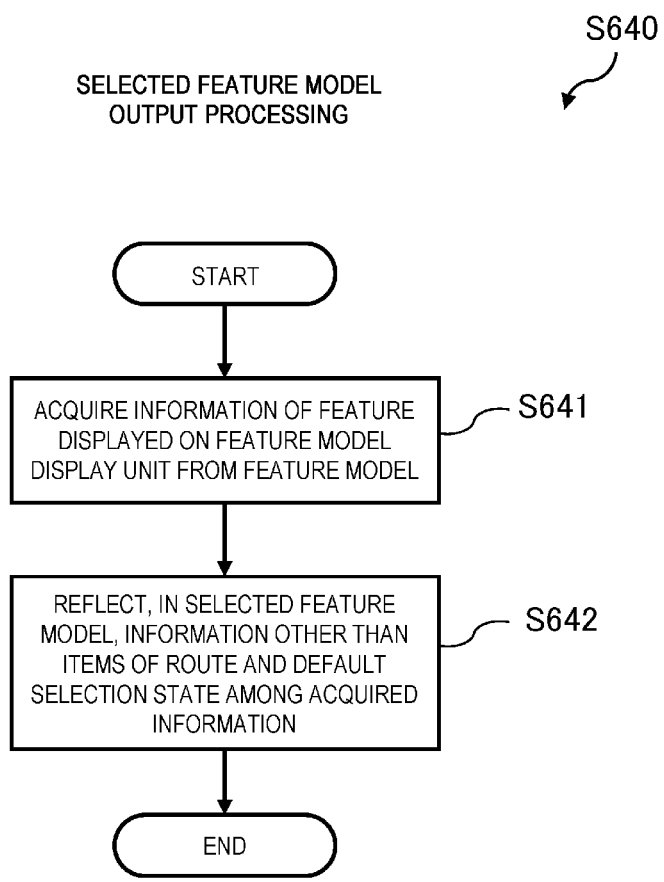
FIG. 6D is a flowchart showing selected feature model output processing.

FIG. 6D is a flowchart showing processing (hereinafter, referred to as "selected feature model output processing S640") performed by the configuration selection unit 125 when the result output button 503 in FIG. 5 is operated. Hereinafter, the selected feature model output processing S640 will be described with reference to FIG. 6D.

As shown in FIG. 6D, first, the configuration selection unit 125 acquires, from the feature model 111 information, a feature ID corresponding to a feature displayed on the feature model display unit 510 (information of the corresponding record) (S641).

Next, the configuration selection unit 125 reflects, in the selected feature model 114, information other than contents of the route 1114 and the default selection state 1116 among the acquired information (S642). At this time, the configuration selection unit 125 estimates a tree structure of a feature model based on, for example, a content of the parent feature ID 1117 of the feature model 1111, and stores, based on the estimated tree structure, feature IDs of child features of features in the child feature 1145 of the selected feature model 114.

Figure 6E:
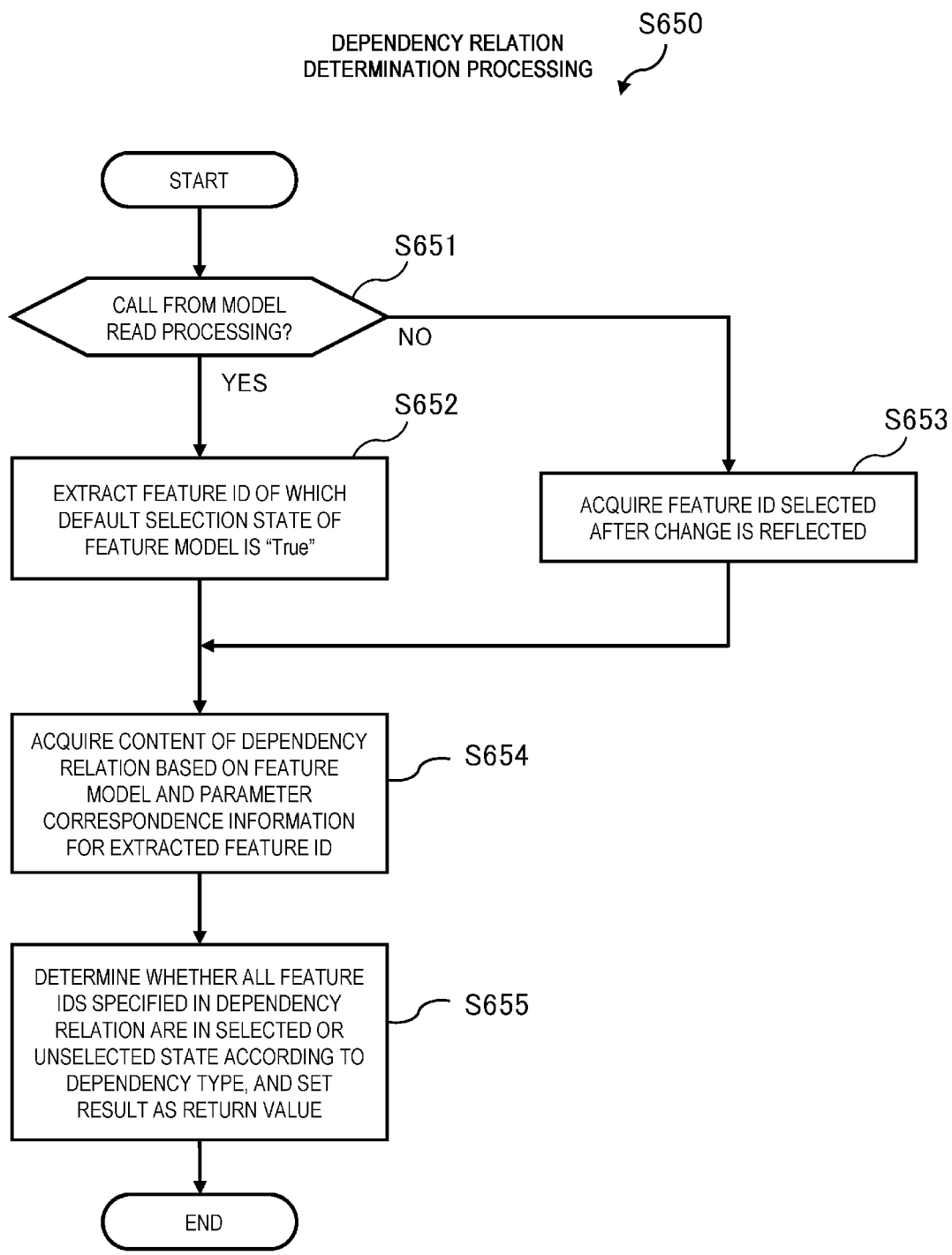
FIG. 6E is a flowchart showing a dependency relation determination processing.

FIG. 6E is a flowchart showing the dependency relation determination processing S650 performed by the configuration selection unit 125. Hereinafter, the dependency relation determination processing S650 will be described with reference to FIG. 6E.

As shown in FIG. 6E, first, the configuration selection unit 125 determines a call factor of the processing (whether the call is from the feature model read processing S610 of FIG. 6A or from the configuration selection result reflection processing S630 of FIG. 6C) (S651). When the call is from the feature model read processing S610 of FIG. 6A (S651: YES), the processing proceeds to S652. On the other hand, when the call is from the configuration selection result reflection processing S630 of FIG. 6C (S651: NO), the processing proceeds to S653.

In S652, the configuration selection unit 125 extracts from the feature model 111 a feature ID of a record (feature) in which "True" is stored in the default selection state 1116 (S652). Thereafter, the processing proceeds to S654.

In S653, the configuration selection unit 125 extracts a feature ID (changed feature ID) designated in the selected feature information display unit 530. Thereafter, the processing proceeds to S654.

In S654, the configuration selection unit 125 acquires information related to a dependency relation (a content of the latest dependency 1115 of the feature model 111 and a content of the latest dependency 1135 of the parameter correspondence information 113) for a feature corresponding to the feature ID extracted in S652 or S653.

Next, the configuration selection unit 125 determines, for the extracted feature ID, whether there is a contradiction between the contents of the dependency 1115 of the feature model 111 and the dependency 1135 of the parameter correspondence information 113, and returns a determination result as a return value (S655). Thereafter, the processing ends. For example, when the dependency relation is "AND", the configuration selection unit 125 determines whether the extracted feature ID is included in the feature ID 1141 of the selected feature model 114, and returns a determination result as a return value. For example, when the dependency relation is "XOR", the configuration selection unit 125 determines whether the extracted feature ID is included in the feature ID 1141 of the selected feature model 114, and returns a determination result as a return value.

As described above, a user can visually and easily select and set a feature using the setting reception screen 500 in a graphical user interface (GUI) format, and can efficiently generate an appropriate construction script based on the latest feature model 111 and the latest construction script structure 112.

Analysis of Construction Script Structure

Figure 7:
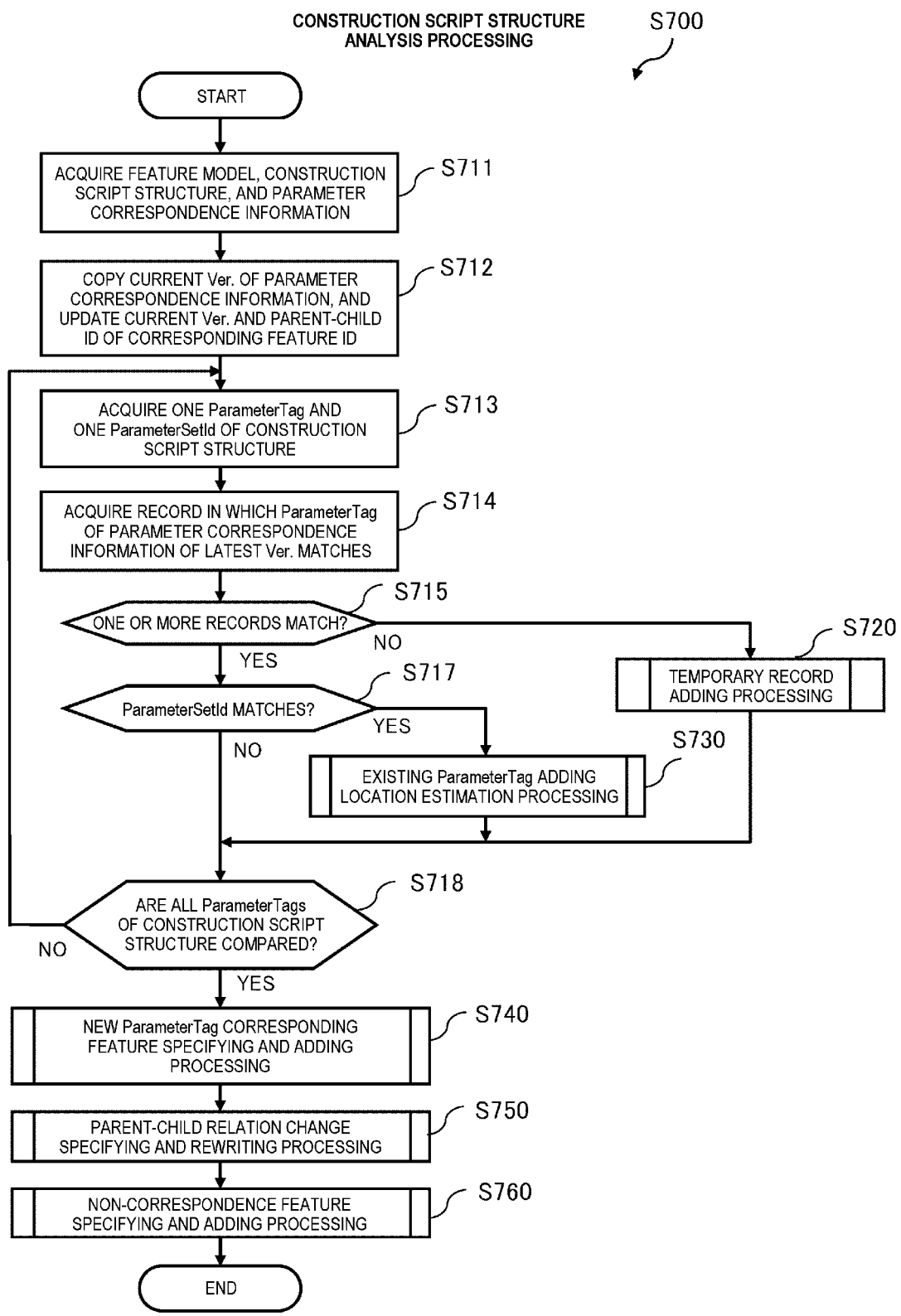
FIG. 7 is a flowchart showing construction script structure analysis processing.

FIG. 7 is a flowchart showing processing (hereinafter, referred to as "construction script structure analysis processing S700") performed by the parameter correspondence information update unit 120 shown in FIG. 3. Hereinafter, the construction script structure analysis processing S700 will be described with reference to FIG. 7.

As shown in FIG. 7, first, the parameter correspondence information update unit 120 reads the feature model 111, the construction script structure 112, and the parameter correspondence information 113 (S711).

Next, the parameter correspondence information update unit 120 copies a content of a record in which the current Ver. 1130 of the parameter correspondence information 113 is the latest version, and replaces the old Ver. 1131 of the copied record with the version of the current Ver. 1130. After the replacement, the parameter correspondence information update unit 120 stores the version of the latest Ver. in the current Ver. 1130 of the copied record. Next, the parameter correspondence information update unit 120 updates the parent feature ID 1133 corresponding to the feature ID 1132 of the copied record based on, for example, a relation between the parent feature ID 1117 of a record in which the feature ID and the feature ID 1111 match each other in the feature model 111 and the feature ID 1111 of a record in which the feature ID and the parent feature ID 1117 match with each other in the feature model 111 (S712).

Next, the parameter correspondence information update unit 120 selects one ParameterSetId 1122b from the correspondence table 112b of the construction script structure 112, and acquires the ParametersName 1123b or the ConnectionsName 1124b of the record. After acquiring the ConnectionsName 1124b, the parameter correspondence information update unit 120 acquires the ParametersName 1123c of a record that matches the ConnectionsName 1124b in the ConnectionsName 1121c of the correspondence table 112c. Then, the parameter correspondence information update unit 120 acquires one ParameterTag 1124d of a record that matches the ParametersName 1121d of the correspondence table 112d for the acquired ParametersName 1123b or ParametersName 1123c (S713).

Next, the parameter correspondence information update unit 120 acquires, from the parameter correspondence information 113, a record in which the current Ver. 1130 is the latest Ver. and a ParameterTag 1157 matches the acquired ParameterTag 1124d (S714). Then, the parameter correspondence information update unit 120 determines whether there is one or more matching records in the parameter correspondence information 113 (S715).

When there is no matching record (S715: NO), the parameter correspondence information update unit 120 executes processing of adding a temporary record to the parameter correspondence information 113 (hereinafter, referred to as "temporary record adding processing S720"). Details of the temporary record adding processing S720 will be described later. Thereafter, the processing proceeds to S718.

On the other hand, when there is one or more matching records (S715: YES), the parameter correspondence information update unit 120 determines whether a record in which the selected ParameterSetId 1122b matches the ParameterSetId 1136 of the record matching in the parameter correspondence information 113 exists in the parameter correspondence information 113 (S717). When there is a record in which the ParameterSetId 1136 matches the ParameterSetId 1122b (S717: YES), the parameter correspondence information update unit 120 executes processing of estimating a location for adding a different correspondence relation of the ParameterTag of the parameter correspondence information 113 (hereinafter, referred to as "existing ParameterTag adding location estimation processing S730"). Details of the existing ParameterTag adding location estimation processing S730 will be described later. Thereafter, the processing proceeds to S718. On the other hand, when there is no record in which the ParameterSetId 1136 matches the ParameterSetId 1122b (S717: NO), the processing proceeds to S718.

In S718, the parameter correspondence information update unit 120 determines whether all ParameterTags 1124d of the construction script structure 112 are compared. When all ParameterTags 1124d of the construction script structure 112 are not compared (S718: NO), the parameter correspondence information update unit 120 returns to the processing of specifying the ParameterSetId of the construction script structure and acquiring one ParameterTag again (S713). On the other hand, when all ParameterTags 1124d of the construction script structure 112 are compared (S718: YES), the parameter correspondence information update unit 120 executes processing of specifying and adding the feature ID 1132 corresponding to a new ParameterTag 1137 (hereinafter, referred to as "new ParameterTag corresponding feature specifying and adding processing S740") with respect to the record in which a temporary record is added in the parameter correspondence information 113. Details of the new ParameterTag corresponding feature specifying and adding processing S740 will be described later.

Next, the parameter correspondence information update unit 120 specifies a change in a parent-child relation of the feature model 111, and executes processing of rewriting the parameter correspondence information 113 so as to have a changed relation (hereinafter, referred to as "parent-child relation change specifying and rewriting processing S750"). Details of the parent-child relation change specifying and rewriting processing S750 will be described later.

Next, the parameter correspondence information update unit 120 executes processing of specifying and adding a non-correspondence feature by using a content of the relation 1118 with a parent of the feature model 111 (hereinafter, referred to as "non-correspondence feature specifying and adding processing S760").

Figure 8A:
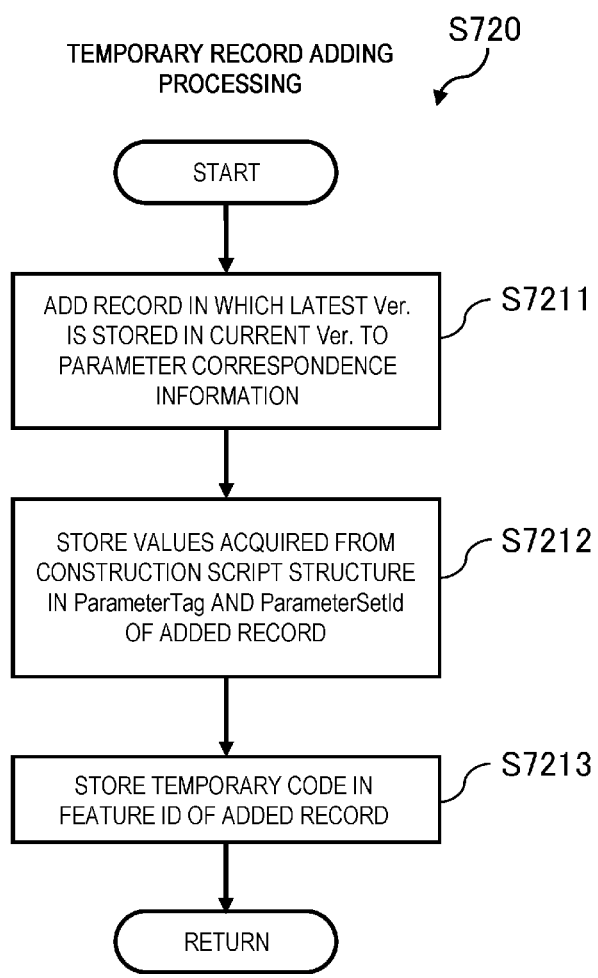
FIG. 8A is a flowchart showing temporary record adding processing.

FIG. 8A is a flowchart illustrating details of the temporary record adding processing S720 in FIG. 7. The parameter correspondence information update unit 120 adds a temporary record to the end of the parameter correspondence information 113 by executing the temporary record adding processing S720. The temporary record adding processing S720 will be described below.

As shown in FIG. 8A, first, the parameter correspondence information update unit 120 adds a new record to the parameter correspondence information 113, and stores the latest version in the current Ver. 1130 of the added record (S7211).

Next, the parameter correspondence information update unit 120 stores, in the ParameterSetId 1136, the ParameterTag 1137, the parent ParameterTag 1138, and the child ParameterTag 1139 of the added record, the ParameterTag 1124d acquired from the construction script structure 112 in S713 of FIG. 7, and the ParameterTags 1124d and the ParameterSetIds 1122b of a parent and a child of the ParameterTag 1124d (S7212).

Next, the parameter correspondence information update unit 120 stores, in the feature ID 1132 of the added record, a temporary value that does not match (does not overlap) other feature IDs 1132 (S7213).

Figure 8B:
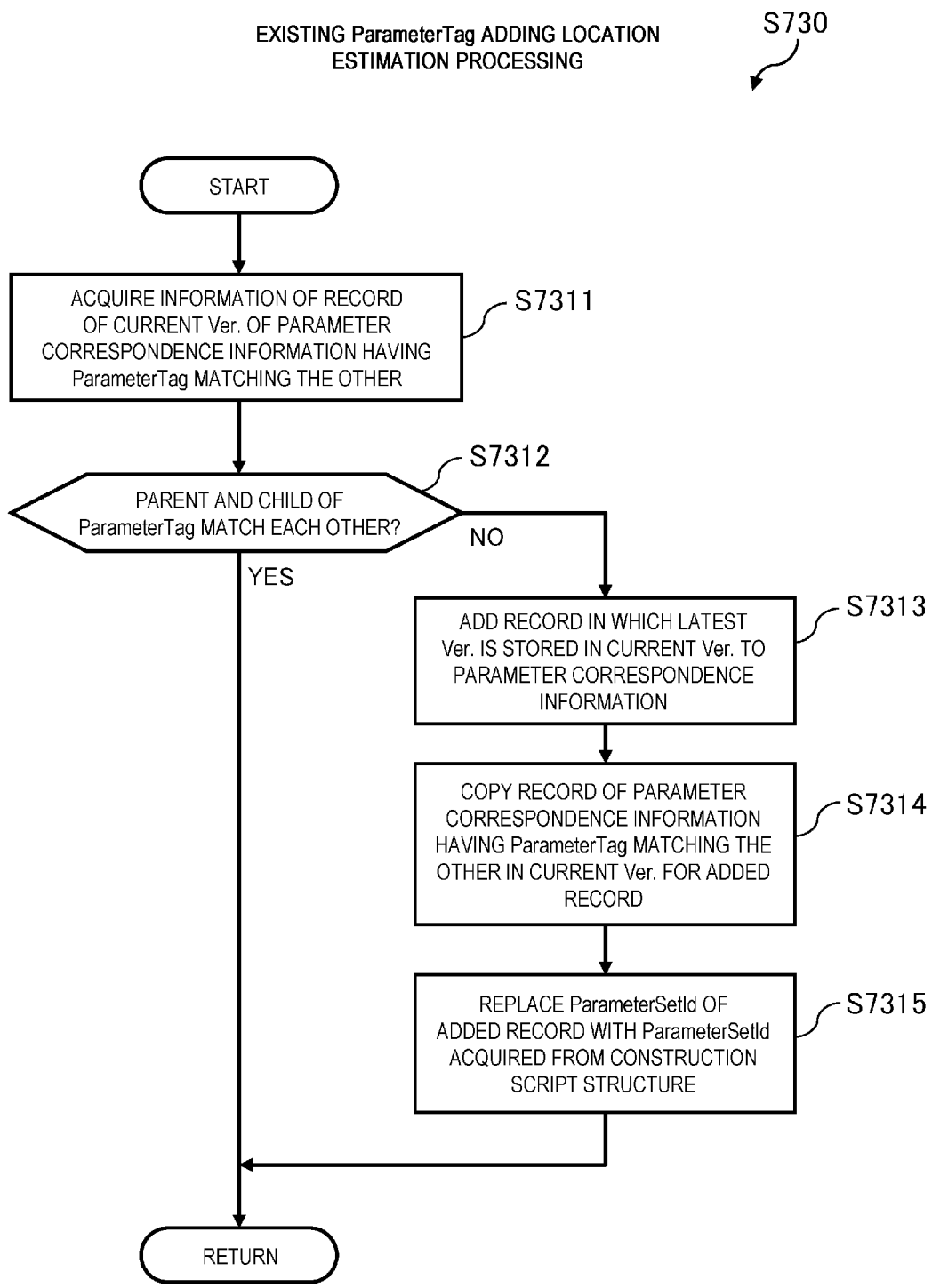
FIG. 8B is a flowchart showing existing ParameterTag adding location estimation processing.

FIG. 8B is a flowchart illustrating details of the existing ParameterTag adding location estimation processing S730 in FIG. 7. The existing ParameterTag adding location estimation processing S730 will be described below.

As shown in FIG. 8B, first, the parameter correspondence information update unit 120 acquires information of a record in which the current Ver. 1130 of the parameter correspondence information 113 is the latest Ver., and the ParameterTag 1137 matches the ParameterTag 1124d acquired from the construction script structure 112 in S713 of FIG. 7 (S7311).

Next, the parameter correspondence information update unit 120 determines whether the parent ParameterTag 1138 and the child ParameterTag 1139 of the acquired record match the ParameterTags 1124d of the parent and the child of the ParameterTag 1124d acquired from the construction script structure 112 in S713 of FIG. 7 (S7312). If match, the processing ends (S7312: YES).

On the other hand, if not (S7312: NO), a new record in which the latest version is stored in the current Ver. 1130 is added to the parameter correspondence information 113 (S7313).

Next, the parameter correspondence information update unit 120 copies, to other items of the added record, information of a parameter correspondence information record in which the current Ver. 1130 is the latest version and the ParameterTag 1157 matches the ParameterTag 1124d acquired from the construction script structure 112 in S713 of FIG. 7 (S7314).

Next, the parameter correspondence information update unit 120 stores, in the ParameterSetId 1136 of the added record, the ParameterSetId 1122b acquired from the construction script structure 112 in S713 of FIG. 7, and replaces the parent ParameterTag 1138 and the child ParameterTag 1139 of the acquired record with the ParameterTags 1124d of the parent and the child of the ParameterTag 1124d acquired from the construction script structure 112 in S713 of FIG. 7 (S7315). Thereafter, the processing ends.

Figure 8C:
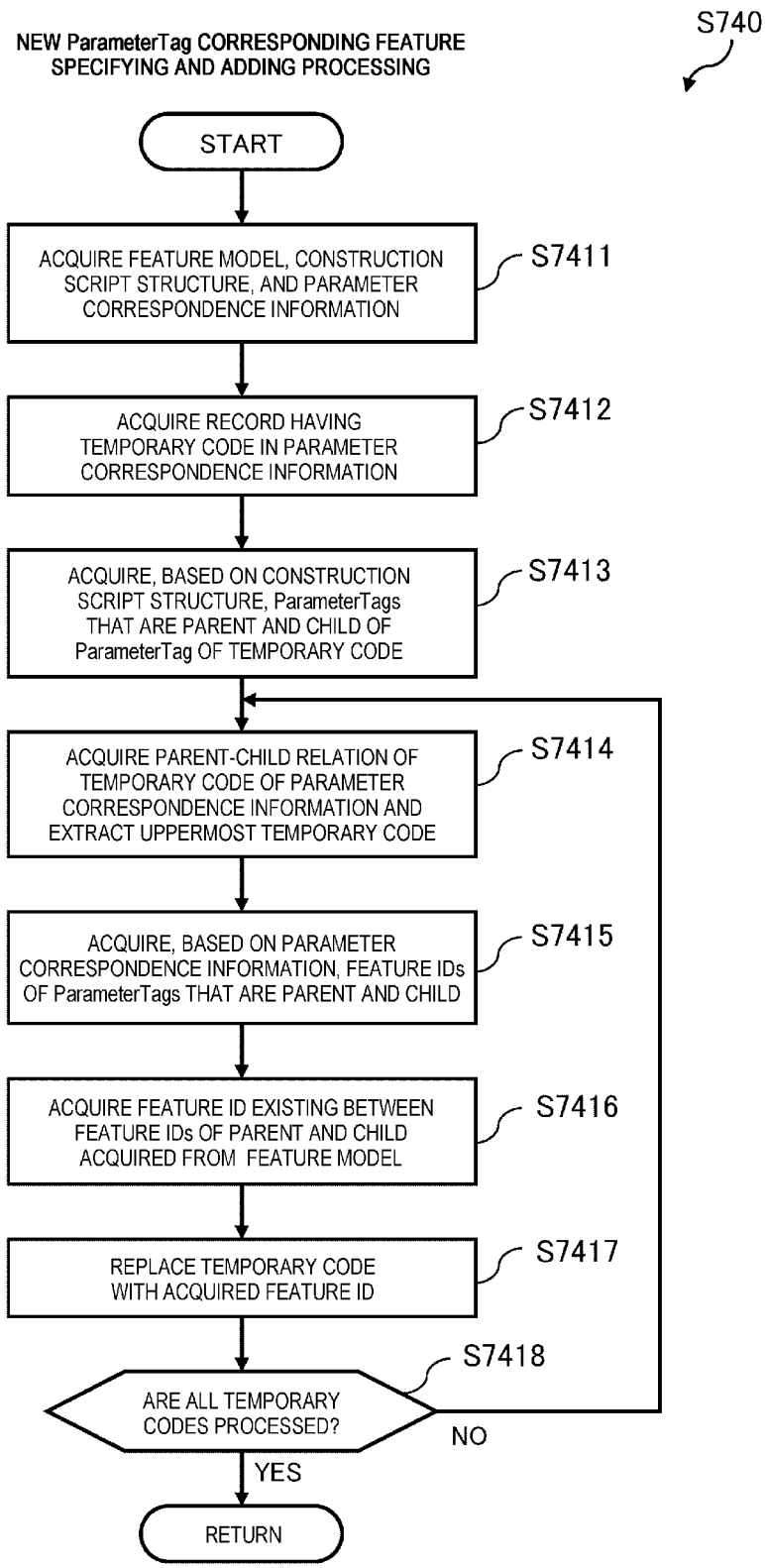
FIG. 8C is a flowchart showing new ParameterTag corresponding feature specifying and adding processing.

FIG. 8C is a flowchart illustrating details of the new ParameterTag corresponding feature specifying and adding processing S740 in FIG. 7. Hereinafter, the new ParameterTag corresponding feature specifying and adding processing S740 will be described with reference to FIG. 8C.

As shown in FIG. 8C, first, the parameter correspondence information update unit 120 acquires the feature model 111, the construction script structure 112, and the parameter correspondence information 113 (S7411).

Next, the parameter correspondence information update unit 120 acquires a record in which a temporary code is stored in the feature ID 1132 of the parameter correspondence information 113 (S7412).

Next, the parameter correspondence information update unit 120 acquires, from the construction script structure 112, ParameterTags that are a parent and a child of a ParameterTag of the temporary code (S7413).

Specifically, the parameter correspondence information update unit 120 acquires records including (storing) the ParameterTags 1157 of records in which a temporary code is stored in the ParameterTag 1124*d* of the correspondence table 112*d* of the construction script structure 112 and in the feature ID 1132.

Next, when the ParameterTag 1124*d* has a hierarchical structure, the parameter correspondence information update unit 120 extracts an upper or lower element of an element which the ParameterTag 1157 matches. When there is no lower element, the parameter correspondence information update unit 120 determines that there is no lower element. When there is no upper element, the parameter correspondence information update unit 120 acquires a record in which the ParametersName 1121*d* of the record in the correspondence table 112*d* matches the ParametersName 1123*b* of the correspondence table 112*b* or the ParametersName 1123*c* of the correspondence table 112*c* related to a ParameterSetId, and acquires a component name by executing the following processing (1) and (2).

(1) When the ParametersName 1121*d* matches the ParametersName 1123*b* of the correspondence table 112*b*, the component name is acquired from the ComponentName 1121*b*.

(2) When the ParametersName 1121*d* matches the ParametersName 1123*c* of the correspondence table 112*c*, the component name of the TargetComponentName 1122*c* is acquired. Alternatively, the component name is acquired from the ComponentName 1121*b* of a record in which the ConnectionsName 1124*b* matches the ConnectionsName 1121*c* of the correspondence table 112*c* regarding the connection information in the correspondence table 112*b* regarding the ParameterSetId.

Next, the parameter correspondence information update unit 120 extracts a record of an uppermost temporary code among parent-child relations of rows which are the temporary codes by using a parent-child relation of the ParameterTag 1124*d* of the construction script structure 112 of the record which is the temporary code acquired in S7413 (S7414).

For example, when the feature ID 1132 of the parameter correspondence information 113 corresponding to a parent element of the ParameterTag 1124*d* of a record, which is a temporary code, is a temporary code, the parameter correspondence information update unit 120 extracts the parent element of the ParameterTag 1124*d* of the record which is a temporary code.

Next, the parameter correspondence information update unit 120 acquires a corresponding feature ID 1132 from the parameter correspondence information 113 for the element of the upper or lower ParameterTag 1124*d* extracted in S7414 (S7415).

Specifically, first, the parameter correspondence information update unit 120 acquires the feature ID 1132 of a row of the parameter correspondence information 113 in which the acquired upper or lower element of the ParameterTag 1124*d* matches the ParameterTag 1137 and the current Ver. 1130 is the latest version. When there is no upper element and the component name is acquired, the parameter correspondence information update unit 120 acquires the feature ID 1111 in which the parent feature ID 1117 of the feature model 111 is a root feature and the value 1113 matches the acquired component name. The parameter correspondence information update unit 120 identifies whether the feature is a root feature based on, for example, the absence of the parent feature ID 1117 of the feature model 111.

Next, the parameter correspondence information update unit 120 uses a feature ID 1111 corresponding to the upper or lower element of the ParameterTag 1124*d* acquired in the processing S7415 to acquire the feature ID 1111 existing in the feature model 111 (S7416).

Specifically, first, when the lower element feature ID 1111 exists, the parameter correspondence information update unit 120 acquires the parent feature ID 1117 as a candidate ID. Next, for the acquired upper element feature ID 1111, the parameter correspondence information update unit 120 acquires, as a candidate ID, the feature ID 1111 of the row of the feature model 111, which matches the upper element feature ID 1111 acquired in the parent feature ID 1117.

When the acquired feature ID 1111 corresponds to the upper element, the parameter correspondence information update unit 120 uses the candidate ID as a feature ID to which a correspondence relation is newly added. On the other hand, when there are two feature IDs 1111 acquired and they match each other, the parameter correspondence information update unit 120 uses the candidate ID as a feature ID to which a correspondence relation is newly added. If not, the parameter correspondence information update unit 120 acquires the parent feature ID 1117 of the candidate ID acquired from the lower element, and compares the parent feature ID 1117 with the candidate ID acquired from the upper element. The parameter correspondence information update unit 120 repeats the above operations until the two feature IDs 1111 match each other, thereby using the candidate ID with the feature ID 1111, in which the value 1113 is described among the candidate ID extracted from the lower element and all the parent feature IDs 1117, as the feature ID to which a correspondence relation is newly added.

When there are a plurality of feature IDs 1111 in which the values 1113 are described, a user such as a developer selects one of them, or a new ParameterTag 1124*d* of the construction script structure 112 is added so that the plurality of feature IDs are not detected.

Next, the parameter correspondence information update unit 120 stores the feature ID acquired in S7416 in the feature ID 1132 of the record acquired in S7412 in which the feature ID 1132 of the parameter correspondence information 113 is a temporary code (or replaces the temporary code) (S7417).

Next, the parameter correspondence information update unit 120 determines whether all records acquired in S7412 in which the feature ID 1132 of the parameter correspondence information 113 is a temporary code are processed (S7418). If the processing is not completed (S7418: NO), the parameter correspondence information update unit 120 re-executes the processing from S7414. If yes (S7418: YES), the processing ends.

FIG. 8D is a flowchart showing details of the parent-child relation change specifying and rewriting processing S750 in FIG. 7. Hereinafter, the parent-child relation change specifying and rewriting processing S750 will be described with reference to FIG. 8D.

As shown in FIG. 8D, first, the parameter correspondence information update unit 120 acquires the old Ver. 1131 of a record in which the current Ver. 1130 of the parameter correspondence information 113 is the latest version, and acquires information of the version before change (S7511). For example, when a latest Ver. T1200 is "2.0", the old Ver. 1131 is "1.0" in the example of FIG. 4D. The parameter correspondence information update unit 120 acquires the feature ID 1132, the parent feature ID 1133, and the child feature ID 1154 of a record in which the Ver. before change corresponds to the current Ver. 1130 of the parameter correspondence information 113.

Next, the parameter correspondence information update unit 120 acquires a record that does not match information of the record in which the current Ver. 1130 of the parameter correspondence information 113 is the latest version with respect to the acquired three pieces of information before change (S7512). Then, the parameter correspondence information update unit 120 replaces, with the information of the Ver. before change, the information of the record that does not match except for the current Ver. 1130 of the record in which the current Ver. 1130 of the parameter correspondence information 113 is the latest version, the old Ver. 1131, the parent feature ID 1133, and the child feature ID 1154 (S7513).

Next, the parameter correspondence information update unit 120 adds the parent feature ID 1133 of the Ver. before change to the dependency 1155 of a record in which the current Ver. 1130 of the last changed parameter correspondence information 113 is the latest version, with a relation of "AND".

Figure 8E:
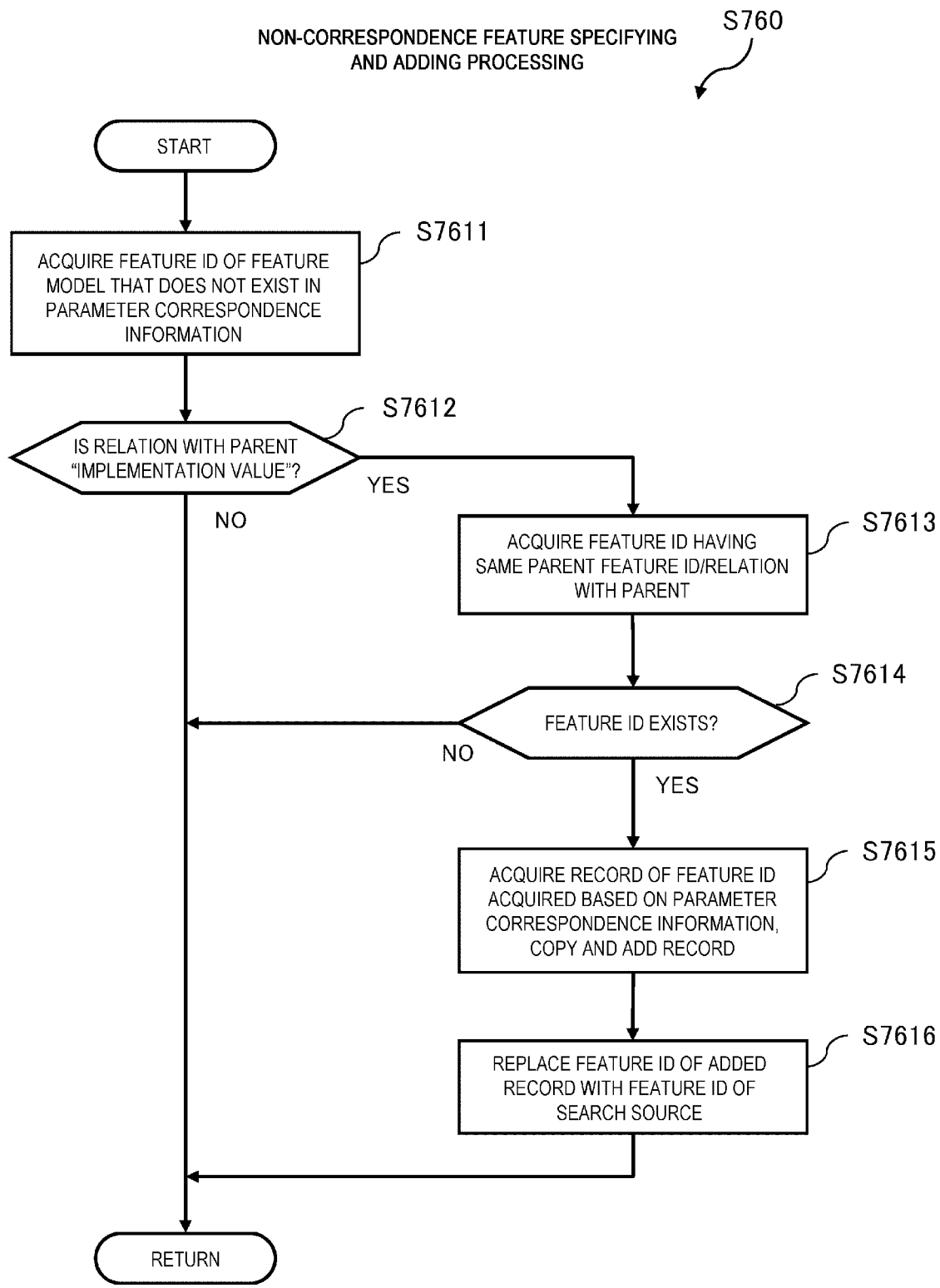
FIG. 8E is a flowchart showing non-correspondence feature specifying and adding processing.

FIG. 8E is a flowchart illustrating details of the non-correspondence feature specifying and adding processing S760 in FIG. 7. Hereinafter, the non-correspondence feature specifying and adding processing S760 will be described with reference to FIG. 8E.

As shown in FIG. 8E, first, the parameter correspondence information update unit 120 acquires, from the feature model 111, a feature ID 1111 that does not exist in the feature ID 1132 of a record in which the current Ver. 1130 of the parameter correspondence information 113 is the latest version (S7611).

Next, the parameter correspondence information update unit 120 determines whether the record of the feature model 111 of the acquired feature ID 1111 is a record in which the relation with parent 1118 is an "implementation value" (S7612). If the record is not a record in which the relation with parent 1118 is an "implementation value" (S7612: NO), the processing ends. On the other hand, if the record is a record in which the relation with parent 1118 is an "implementation value" (S7612: YES), the parameter correspondence information update unit 120 acquires the parent feature ID 1117 of the record and the feature ID 1111 in which the relation with parent 1118 is an "implementation value" (S7613).

Next, the parameter correspondence information update unit 120 determines whether the feature ID 1111 exists (S7614). If the feature ID 1111 does not exist (S7614: NO), the processing ends. On the other hand, if the feature ID 1111 exists (S7614: YES), the processing proceeds to S7615.

In S7615, the parameter correspondence information update unit 120 copies a record in which the feature ID 1132 of the parameter correspondence information 113 matches the feature ID 1111 and the current Ver. 1130 is the latest version, and adds the copied record to the parameter correspondence information 113 (S7615).

Next, the parameter correspondence information update unit 120 replaces the feature ID 1132 of the added record with a feature ID 1111 acquired in S7611 and used in a search after the processing (S7616).

With respect to various aspects of updates (changes) made to the feature model 111 and the construction script structure 112, the environment construction support device 100 can update the parameter correspondence information 113 so as to match the latest contents of the updated feature model 111 and construction script structure 112 by performing the processing shown in FIG. 7 (FIGS. 8A to 8E).

For example, as shown in an update type "A" in FIG. 8F, when a new element is added to the feature model 111 and a new element (such as an IaC tag) is added to the construction script structure 112, the environment construction support device 100 specifies an added location based on a feature ID that is not included in the existing parameter correspondence information 113, and automatically adds, to the parameter correspondence information 113, a correspondence relation between an element of the feature model 111 in which hierarchical structures of a parent and a child at the added location match each other and a structure of the construction script structure 112.

For example, as shown in an update type "B" in FIG. 8F, when a new element is added only to the feature model 111, the environment construction support device 100 specifies an added location based on a feature ID that is not included in the existing parameter correspondence information 113, specifies an element of the feature model 111 that has a common relation with a parent layer of the added location, and automatically adds, to the parameter correspondence information 113, a correspondence relation between the specified element and the structure of the construction script structure 112.

For example, as shown in an update type "C" in FIG. 8F, when a new structure (IaC tag or the like) is added only to the construction script structure 112, the environment construction support device 100 specifies an added location based on a feature ID that is not included in the existing parameter correspondence information 113. When information about a structure (IaC tag or the like having the same name) common to the existing parameter correspondence information 113 exists, the environment construction support device 100 automatically adds, to the parameter correspondence information 113, a correspondence relation between the structure and an element of the feature model 111 by copying the information.

For example, as shown in an update type "D" in FIG. 8F, when a parent-child relation between elements of the feature model 111 is changed, the environment construction support device 100 specifies a changed location based on a difference in the parent-child relation between the elements of the feature model 111 before and after update, and reflects a changed content in the parameter correspondence information 113 by updating the parent-child relation of the corresponding part of the existing parameter correspondence information 113.

Generation of Construction Script Parameter

Figure 9:
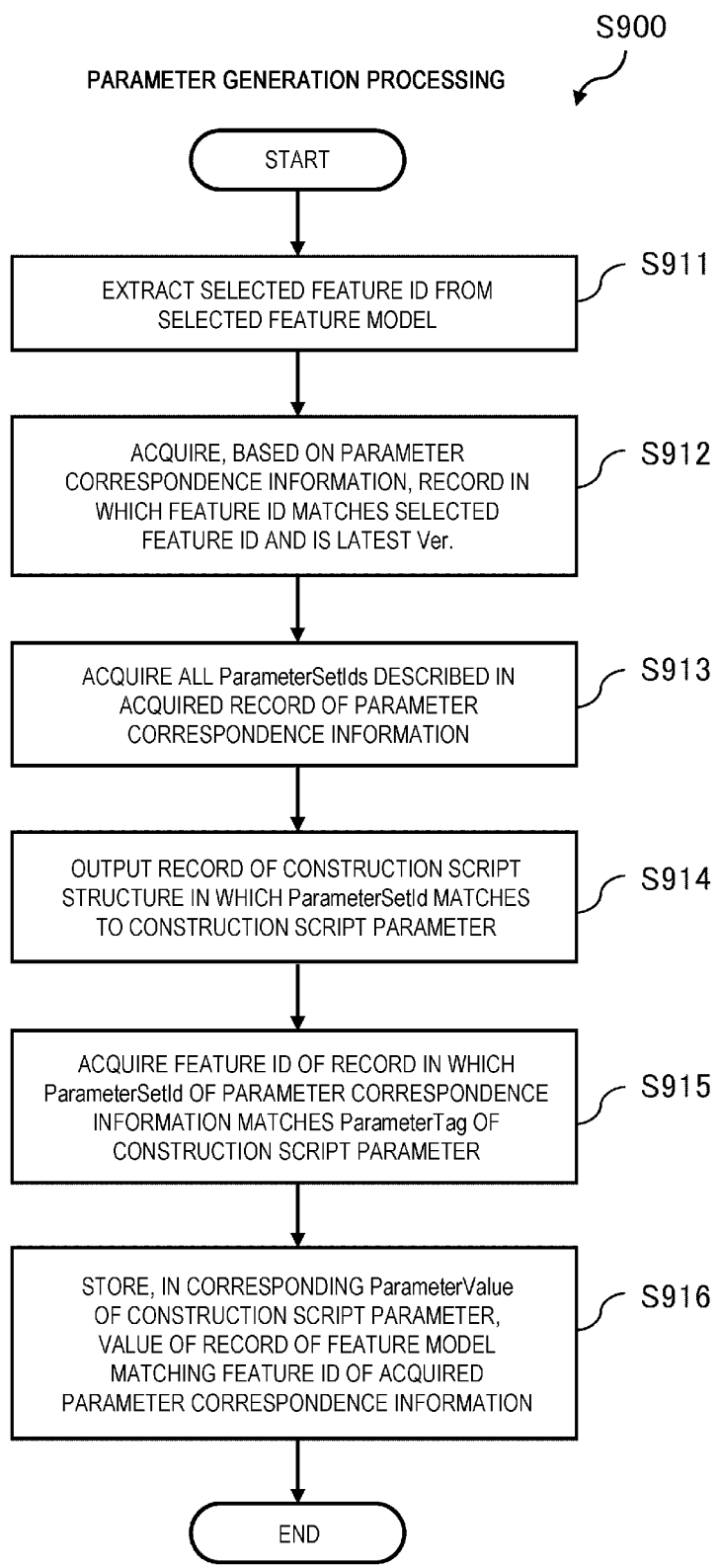
FIG. 9 is a flowchart showing parameter generation processing.

FIG. 9 is a flowchart showing processing (hereinafter, referred to as "parameter generation processing S900") performed when the parameter generation unit 130 shown in FIG. 3 generates the construction script parameter 115. Hereinafter, the parameter generation processing S900 will be described with reference to FIG. 9.

As shown in FIG. 9, first, the parameter generation unit 130 extracts the feature ID 1141 from the selected feature model 114 (S911).

Next, the parameter generation unit 130 acquires, from the parameter correspondence information 113, a record in which the extracted feature ID 1141 matches the feature ID 1132 and the current Ver. 1130 is the latest Ver. (S912).

Next, the parameter generation unit 130 acquires the ParameterSetId 1136 of the record acquired from the parameter correspondence information 113 (S913), extracts a record in which the ParameterSetId 1122*b* matches the ParameterSetId 1136 from the correspondence table 112b of the construction script structure 112, and writes the extracted record as the correspondence table 115b of the construction script parameter 115 (S914). At this time, the parameter generation unit 130 also writes for the correspondence table 112c having a record in which the ConnectionsName 1124b of the table matches the ConnectionsName 1121c. Further, the parameter generation unit 130 also writes for the correspondence table 112d having a record in which the ParametersName 1123b or the ParametersName 1123c of the record in the correspondence table 112c written in the above-described step matches the ParametersName 1121d.

Next, the parameter generation unit 130 acquires the feature ID 1132 of a record in which the ParameterTag 1154d of the correspondence table 115d of the construction script parameter 115 and the ParameterSetId 1152b of the table 115b match the ParameterSetId 1136 and the ParameterTag 1137 of the parameter correspondence information 113, respectively, and the current Ver. 1130 is the latest Ver. (S915).

The parameter generation unit 130 acquires a ParameterSetId 1152b corresponding to the ParameterTag 1154d from the ParameterSetId 1152b of a record in the correspondence table 115b in which the ParametersName 1151d or the ParametersName 1153b matches the ParameterSetId 1152b. Alternatively, after extracting the record in the correspondence table 112a in which the ParametersName 1151d or the ParametersName 1153c matches, the parameter generation unit 130 acquires, from the ParameterSetId 1152b of the record in the correspondence table 115b in which the ConnectionsName 1151c or the ConnectionsName 1154b of the extracted record matches, a ParameterSetId 1152b corresponding to the ParameterTag 1154d.

Next, the parameter generation unit 130 stores, in the ParametersValue 1153d of the correspondence table 115d of the construction script parameter 115 corresponding to the ParameterSetId 1152b and the ParameterTag 1154d, a value 1113 of the record of the feature model 111 in which the feature ID 1132 of the parameter correspondence information 113 acquired in S915 matches the feature ID 1111 (S916).

Generation of Construction Script

Figure 10:
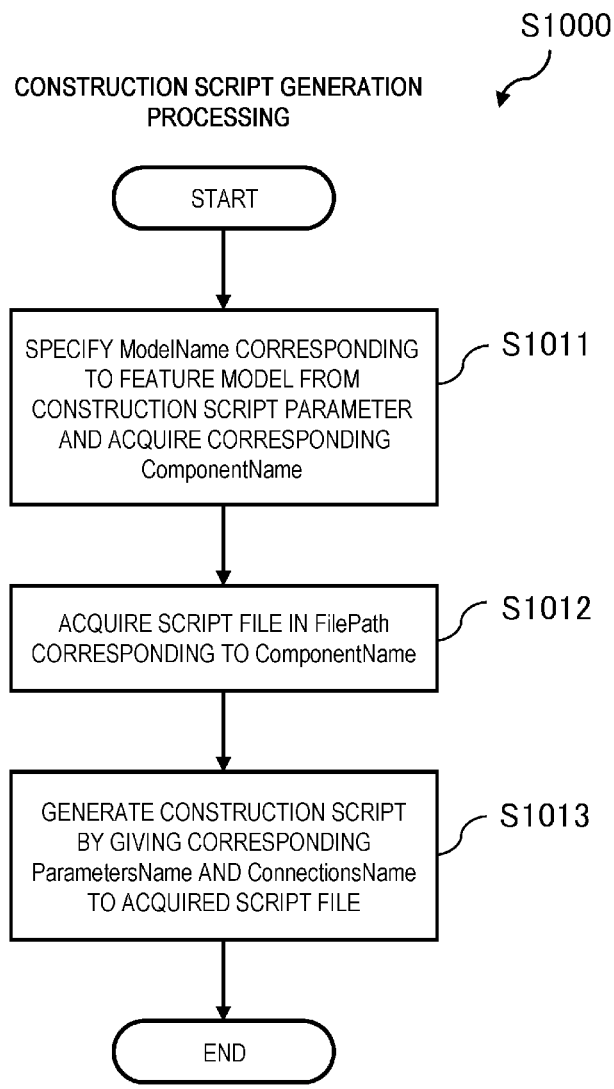
FIG. 10 is a flowchart showing construction script generation processing.

FIG. 10 is a flowchart showing processing (hereinafter, referred to as "construction script generation processing S1000") performed when the construction script generation unit 135 shown in FIG. 3 generates the construction script 116. Hereinafter, the construction script generation processing S1000 will be described with reference to FIG. 10.

As shown in FIG. 10, first, the construction script generation unit 135 specifies a ModelName 1151a corresponding to the value 1113 of a root feature of the feature model 111 from the correspondence table 115a of the construction script parameter 115, and acquires the ComponentName 1152a of the record (S1011).

Next, the construction script generation unit 135 acquires a script file stored in a FilePath 1155b of the record in which a component name of the acquired ComponentName 1152a matches the ComponentName 1151b of the correspondence table 115b (S1012).

Next, the construction script generation unit 135 acquires a record in the correspondence table 115c in which the ParametersName 1153b of the record matches the ConnectionsName 1154b and the ConnectionsName 1151c of the record. The construction script generation unit 135 acquires a record in the correspondence table 115d in which the ParametersName 1153c and the ParametersName 1151d of the acquired record in the correspondence table 115c match each other. Then, the construction script generation unit 135 generates a construction script 116 by providing, to the acquired script file described in the corresponding FilePath 1155b, information of the acquired record in the correspondence table 115c and the acquired record in the correspondence table 115d (S1013).

When providing parameters of the correspondence table 115c to the collected script file described in the corresponding FilePath 1155b, the construction script generation unit 135 specifies, for example, a variable same as the acquired PrametersKey 1152d of correspondence table 115d, and provides a value of the ParametersValue 1153d corresponding to the specified variable to the script file. By using a variable name same as the ParameterTag 1154d in the script file described in the FilePath 1155b, the parameters may be given without using the PrametersKey 1152d.

FIG. 11 shows an example of the construction script 116 generated by the construction script generation unit 135. A description format of the construction script 116 is not necessarily limited to that shown in FIG. 11. In the present example, values stored in the ParametersValue 1153d of the correspondence table 115d shown in FIG. 4E are stored in a script file. For example, "SmallInstance" and "LargeInstance" are stored in "InstanceType" indicated by reference numerals 1171 and 1172, respectively.

As described above in detail, the environment construction support device 100 according to the present embodiment updates the parameter correspondence information 113 so as to correspond to latest contents of the feature model 111 and the construction script structure 112 by comparing the feature model 111 expressing elements of the cloud environment 3 to be constructed in a tree structure with the construction script structure 112 executed when the cloud environment 3 is constructed. Therefore, when the cloud environment 3 is constructed, a user such as a developer is freed from the complicated work due to a change of the feature model 111 and the construction script structure 112, and can efficiently generate the construction script 116 based on the latest contents of the feature model 111 and the construction script structure 112.

An embodiment of the invention has been described above, but the invention is not limited to the above-described embodiment, and includes various modifications and is not necessarily limited to those including all the configurations described above. A part of the configuration of one embodiment may be replaced with the configuration of another embodiment, or the configuration of one embodiment may be added to the configuration of another embodiment. It is possible to add, delete, or replace a part of the configuration of each embodiment with another configuration.

What is claimed is:

1. An environment construction support device for efficiently constructing an environment for implementing an information technology (IT) system comprising:
 a storage unit configured with a processor and a storage device, and configured to store
  a tree structure model being information representing the environment for implementing the IT system in a tree structure, and capable of being updated as needed,
  a construction script structure being information related to a construction script that is a series of codes for constructing the environment, and capable of being updated as needed, and parameter correspondence information being information indicating a correspondence between an element of the tree structure model and an element of the construction script; and a processor configured to
update the parameter correspondence information so as to correspond to latest contents of the tree structure model and the construction script structure by comparing at least one of the tree structure model and the construction script structure with the parameter correspondence information, and compare first information indicating a parent-child relation of elements of the tree structure model with second information indicating a parent-child relation of the elements in the parameter correspondence information, and when the first information and second information do not match, update the second information indicating the parent-child relation of the elements in the parameter correspondence information so as to match the first information indicating the parent-child relation of the elements of the tree structure model.

2. The environment construction support device according to claim 1, wherein
the tree structure model is a feature model including information related to a plurality of features constituting the environment and information indicating a dependency relation between the features.

3. The environment construction support device according to claim 2, wherein
when updating the second information, the processor adds, to information on an element corresponding to a child in the parent-child relation to be updated in the parameter correspondence information, information on an element corresponding to a parent in the parent-child relation before being updated as the information indicating the dependency relation.

4. The environment construction support device according to claim 1, wherein
the processor
specifies, based on the parameter correspondence information, specified elements corresponding to codes having a parent-child relation with a new code when the new code that does not exist in the parameter correspondence information exists in the construction script structure, and
specifies a specified element existing between the specified elements in the tree structure model, and adds information indicating a correspondence between the specified element and the new code to the parameter correspondence information.

5. The environment construction support device according to claim 1, wherein
when a new element that does not exist in the parameter correspondence information exists in the tree structure model, the processor specifies a specified element having a parent same as that of the new element based on the parameter correspondence information, and adds, to the parameter correspondence information, information indicating a correspondence between a code of the series of codes of the construction script structure corresponding to the specified element and the new element.

6. The environment construction support device according to claim 1, wherein
when a new code that does not exist in the parameter correspondence information exists in the construction script structure, the processor specifies a specified code having a parent same as that of the new code based on the parameter correspondence information, and adds, to the parameter correspondence information, information indicating a correspondence between the element of the tree structure corresponding to the specified code and the new code.

7. An environment construction support method for efficiently constructing an environment for implementing an information technology (IT) system comprising:
by an information processing device including a processor and a storage device,
a step of storing
a tree structure model being information representing the environment for implementing an IT system in a tree structure, and capable of being updated as needed,
a construction script structure being information related to a construction script that is a series of codes for constructing the environment, and capable of being updated as needed, and
parameter correspondence information being information indicating a correspondence between an element of the tree structure model and an element of the construction script; and
a step of
updating the parameter correspondence information so as to correspond to latest contents of the tree structure model and the construction script structure by comparing at least one of the tree structure model and the construction script structure with the parameter correspondence information and
comparing first information indicating a parent-child relation of elements of the tree structure model with second information indicating a parent-child relation of the elements in the parameter correspondence information, and when the first information and the second information do not match, updating the second information indicating the parent-child relation of the elements in the parameter correspondence information so as to match the first information indicating the parent-child relation of the elements of the tree structure model.

8. The environment construction support method according to claim 7, wherein
the tree structure model is a feature model including information related to a plurality of features constituting the environment and information indicating a dependency relation between the features.

9. The environment construction support method according to claim 8, further comprising:
when updating the second information, a step of the information processing device adding, to information on an element corresponding to a child in the parent-child relation to be updated in the parameter correspondence information, information on an element corresponding to a parent in the parent-child relation before being updated as the information indicating the dependency relation.

10. The environment construction support method according to claim 7, further comprising:
by the information processing device,
a step of specifying, based on the parameter correspondence information, specified elements corresponding to codes having a parent-child relation with a new code when the new code that does not exist in the parameter correspondence information exists in the construction script structure; and a step of specifying a specified element existing between the specified elements in the tree structure model, and adding information indicating a correspondence between the specified element and the new code to the parameter correspondence information.

11. The environment construction support method according to claim 7, further comprising:

when a new element that does not exist in the parameter correspondence information exists in the tree structure model, a step of the information processing device specifying, based on the parameter correspondence information, a specified element having a parent same as that of the new element, and adding, to the parameter correspondence information, information indicating a correspondence between a code of the series of codes of the construction script structure corresponding to the specified element and the new element.

12. The environment construction support method according to claim 7, further comprising:

when a new code that does not exist in the parameter correspondence information exists in the construction script structure, a step of the information processing device specifying, based on the parameter correspondence information, a specified code having a parent same as that of the new code, and adding, to the parameter correspondence information, information indicating a correspondence between the element of the tree structure corresponding to the specified code and the new code.

\* \* \* \* \*